(12) United States Patent
Wall et al.

(10) Patent No.: US 8,762,268 B2
(45) Date of Patent: Jun. 24, 2014

(54) ELECTRONIC COMMERCE NETWORK WITH TRANSACTIONS ANALYTICS

(71) Applicant: Index Systems, Inc., San Francisco, CA (US)

(72) Inventors: Jonathan Wall, San Francisco, CA (US); Marc Freed-Finnegan, San Francisco, CA (US)

(73) Assignee: Index Systems, Inc., San Francisco, CA (US)

( * ) Notice: Subject to any disclaimer, the term of this patent is extended or adjusted under 35 U.S.C. 154(b) by 0 days.

(21) Appl. No.: 13/934,825

(22) Filed: Jul. 3, 2013

(65) Prior Publication Data

US 2014/0012739 A1    Jan. 9, 2014

Related U.S. Application Data

(60) Provisional application No. 61/668,254, filed on Jul. 5, 2012, provisional application No. 61/668,255, filed on Jul. 5, 2012, provisional application No. 61/755,135, filed on Jan. 22, 2013.

(51) Int. Cl.
*G06Q 20/10*    (2012.01)

(52) U.S. Cl.
USPC .............................................. 705/39; 705/40

(58) Field of Classification Search
USPC ...................................................... 705/35–40
See application file for complete search history.

(56) References Cited

U.S. PATENT DOCUMENTS

| | | | |
|---|---|---|---|
| 8,291,016 B1 | 10/2012 | Whitney et al. | |
| 2011/0016038 A1* | 1/2011 | Hochenberger et al. | 705/37 |
| 2012/0158584 A1 | 6/2012 | Behren et al. | |
| 2012/0215589 A1 | 8/2012 | Tavares et al. | |

* cited by examiner

*Primary Examiner* — Thu Thao Havan
(74) *Attorney, Agent, or Firm* — Miles & Stockbridge P.C.

(57) ABSTRACT

A system that processes transactions, in response to a transaction using a financial instrument, receives an identity of a financial instrument, such as a card hash. The system creates an anonymous account that corresponds to the financial instrument, and stores line level data associated with the transaction in the anonymous account. Future transactions that use the same financial instrument are also stored in the anonymous account. As a result, all transactions can be linked to the same user.

27 Claims, 13 Drawing Sheets

US 8,762,268 B2

ELECTRONIC COMMERCE NETWORK WITH TRANSACTIONS ANALYTICS

CROSS REFERENCE TO RELATED APPLICATIONS

This application claims priority of Provisional Patent Application Ser. No. 61/668,254, filed on Jul. 5, 2012, Provisional Patent Application Ser. No. 61/668,255, filed on Jul. 5, 2012, and Provisional Patent Application Ser. No. 61/755,135, filed on Jan. 22, 2013, the contents of each of which is hereby incorporated by reference.

FIELD

One embodiment is directed generally to a computer system, and in particular to an electronic commerce network and system.

BACKGROUND INFORMATION

Electronic commerce, or "e-commerce", is generally considered the buying and selling of a product or service over electronic systems or a "commerce network" such as the Internet and other computer networks. Electronic commerce can include functionality such as mobile commerce, electronic funds transfer, supply chain management, Internet marketing, online transaction processing, electronic data interchange ("EDI"), inventory management systems, and automated data collection systems. Electronic commerce and a commerce network as a core function provides the exchange of data to facilitate the financing and payment aspects of business transactions. Further, a commerce network that accommodates many different types of payments accumulates data that can provide useful analytical information.

SUMMARY

One embodiment is a system that processes transactions. In response to a transaction using a financial instrument, the system receives an identity of a financial instrument, such as a card hash. The system creates an anonymous account that corresponds to the financial instrument, and stores line level data associated with the transaction in the anonymous account. Future transactions that use the same financial instrument are also stored in the anonymous account. As a result, all transactions can be linked to the same user.

BRIEF DESCRIPTION OF THE DRAWINGS

Further details, advantages, and modifications will become apparent from the following detailed description of embodiments of the invention, which is to be taken in conjunction with the accompanying drawings, in which like numerals denote like elements.

DETAILED DESCRIPTION

One embodiment is an electronic commerce network that collects data from mobile transactions as well as all other types of transactions. The data includes line level data of each transaction. Analytic tools can then be used to mine the collected data.

Figure 1:
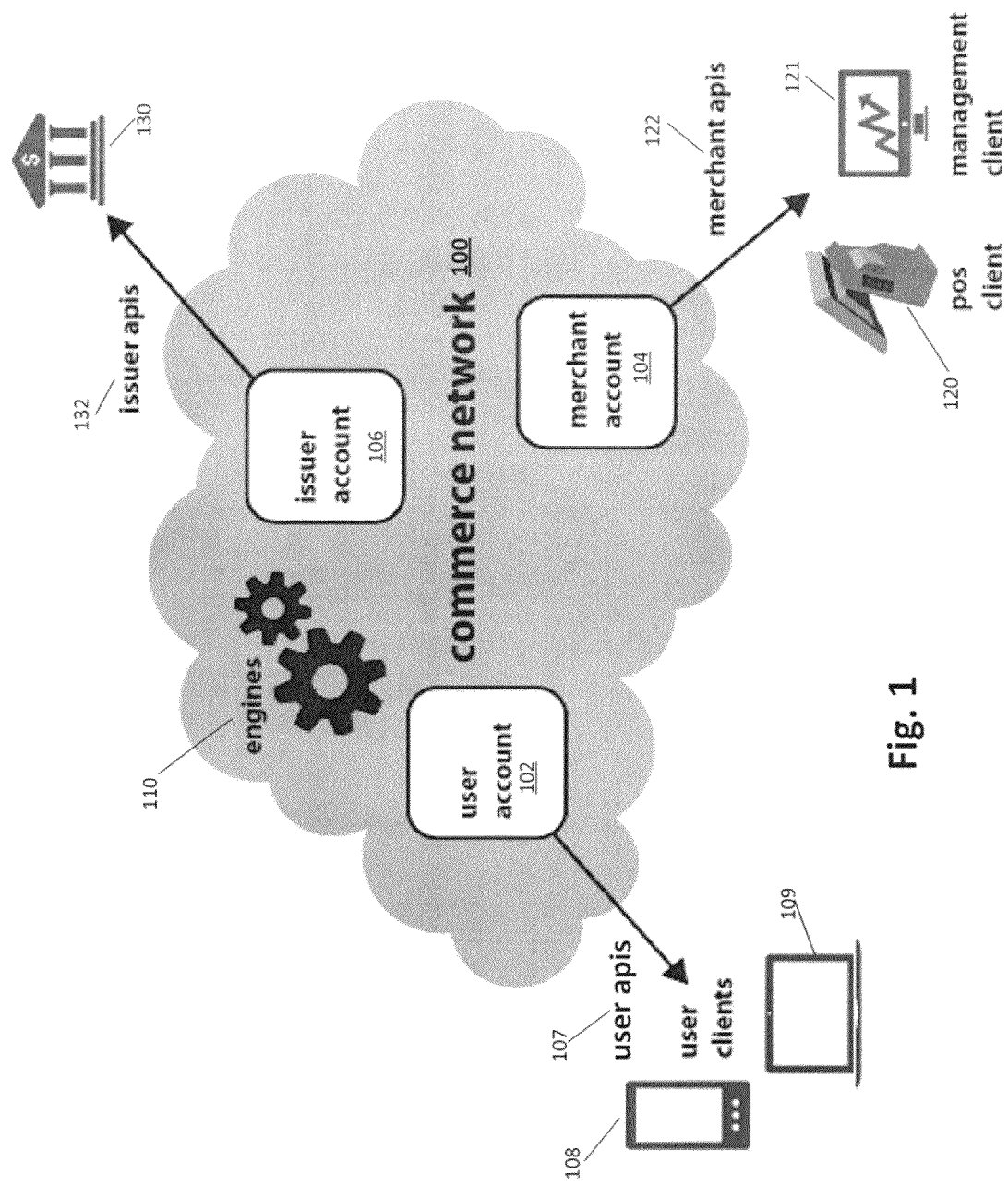
FIG. 1 is an overview diagram of an electronic commerce network and associated peripheral devices in accordance with embodiments of the present invention.

FIG. 1 is an overview diagram of an electronic commerce network 100 and associated peripheral devices in accordance with embodiments of the present invention. Network 100 is implemented by one or more server computers ("servers") and is connected to the peripheral devices via the Internet, or other telecommunication means, to provide the functionality disclosed in detail below. Network 100 includes and implements at least one user/customer account 102, at least one merchant/retailer account 104 and at least one issuer account 106. Network 100 further includes one or more engines 110, including a transaction engine and a business optimization engine, as described in more detail below. The functionality of network 100 in one embodiment is accessible by any user over the Internet using a browser or any other interface method. The interface method can include application programming interfaces ("API"s) 107, 122 and 132.

Network 100 functions as a fabric that connects accounts for the principal parties of commerce—users, merchants, and issuers of tender. Network 100 enables fluid commerce by making accounts online and accessible. These accounts can be joined to facilitate rich interactions including purchase transactions, offer targeting/delivery, and other personalized experiences. The accounts are made accessible by the associated peripheral devices, including clients such as user clients 108, 109, and merchant-based clients such as point of sale ("POS") client 120 and management client 121, which extend the reach of network 100 to a user's computer 109, mobile device 108, the merchant's counter via POS 120, and any other device that can interface with network 100.

Figure 2:
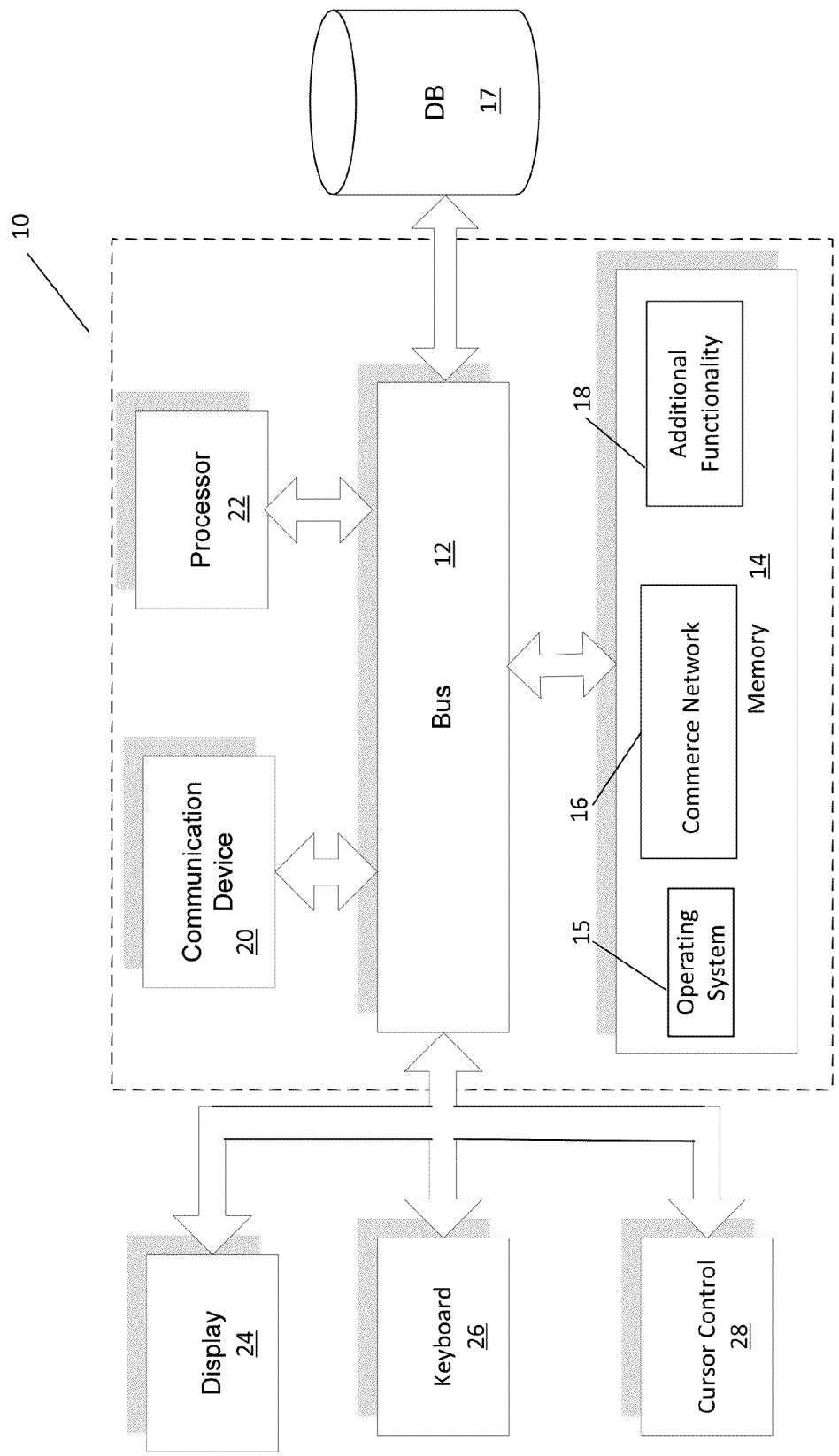
FIG. 2 is a block diagram of a computer server/system that can implement the network of FIG. 1, and well as any of the associated peripheral devices of FIG. 1, in accordance with an embodiment of the present invention.

FIG. 2 is a block diagram of a computer server/system 10 that can implement network 100 of FIG. 1, and well as any of the associated peripheral devices of FIG. 1, in accordance with an embodiment of the present invention. Although shown as a single system, the functionality of system 10 can be implemented as a distributed system. Further, the functionality of network 100 can be implemented by a single system 10, or by multiple systems 10. Further, any of the devices/functionality shown in FIG. 1 can be implemented by one or more system 10s. Finally, all elements shown in FIG. 2 are not required in any implementation of any portion of network 100.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a commerce network module 16 that provides the functionality of commerce network 100 of FIG. 1, as disclosed in more detail below. System 10 can be part of a larger system, such as a database management system or a financial management system. Therefore, system 10 will typically include one or more additional functional modules 18 to include the additional functionality. A database 17 is coupled to bus 12 to provide centralized storage for modules 16 and 18.

Referring again to FIG. 1, each user of network 100 is represented by user account 102. User account 102 holds basic profile information, global and merchant specific payment preferences, and any number and type of tender instruments including debit cards, private label cards, gift cards, bank accounts, coupons, offers, loyalty cards, loyalty points, etc. Users may access and manage this information through a range of user clients such as clients 108, 109. The user clients can be any device that allows access to network 100 over the Internet or other network, and may include an Internet browser. The clients may include a web page, mobile applications, and tablet interfaces which enable users to add/delete tender instruments, view a transaction history, and perform a range of other account management functions. User account 102 facilitates the collection and management of any tender type from any platform (e.g., web page, mobile, social) by the user. User account 102 also enables the seamless sharing of these tender instruments with the merchant at the time of transaction via network 100.

Each merchant using network 100 creates a merchant account 104 that represents the merchant on network 100. Merchant account 104 holds basic information such as store address/location(s) and merchant acquiring information that defines how payment should flow to the merchant. Merchant account 104 also holds detailed user and store level transaction information and analytics. Finally, merchant account 104 contains information about merchant clients such as POS client 120 and management client 121 which may access and interact with merchant account 104. An authorized merchant POS client such as client 120 may connect to network 100 via POS or merchant APIs 122 to facilitate user authentication and transaction settlement from the POS. Similarly, merchant management client 121 can interact with merchant account 104 via a web page or tablet interfaces to access real-time analytics, configure account settings, or interact with engines 110, including the business optimization engine. The business optimization engine allows merchants to tailor rich offers, loyalty rewards, and other promotions to individual users or user segments to assist with customer acquisition and retention.

Each issuer 130 of tender using network 100 has a corresponding issuer account 106. An issuer account 106 may include an authorization policy, an authorization mechanism and a settlement mechanism for each tender type the issuer supports. The authorization and settlement mechanisms specified for each tender are executed by the transaction engine as it processes a transaction. While traditional forms of tender use existing infrastructure for authorization and settlement, newer forms of tender may use new authorization and settlement mechanisms. Therefore, in one embodiment the issuer API 132 includes new authorization and settlement mechanisms, including authorization by web services and direct settlement.

As discussed, embodiments interconnect users and merchants/retailers to enable complex transaction processing and other functionality. To initiate the functionality of network 100, in one embodiment a user downloads an application to a mobile device and sets up a user account 102. An account may be set up through a website, a mobile application, or any other method.

Figure 3:
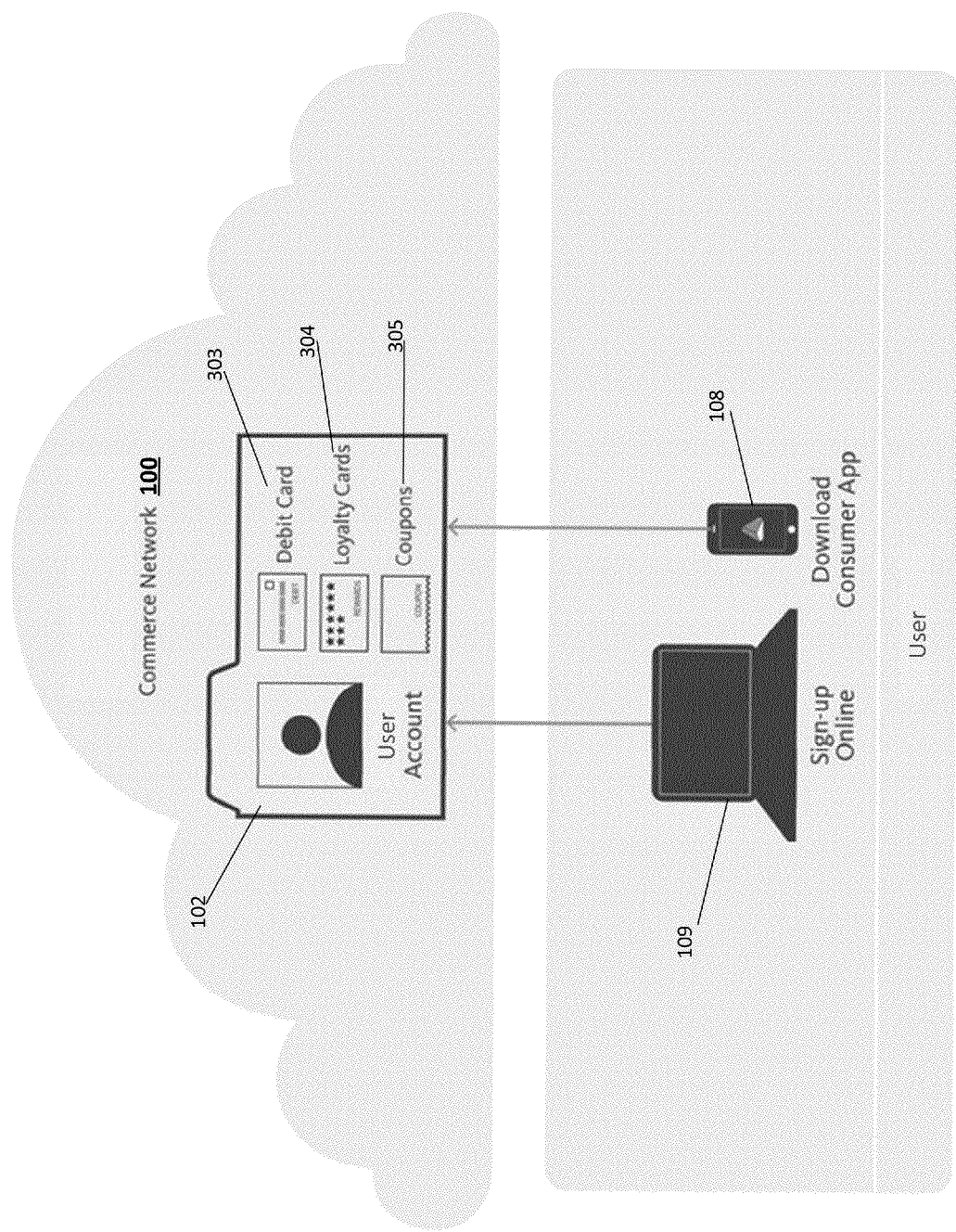
FIG. 3 is an overview diagram illustrating a user initiating the functionality of the network of FIG. 1 in accordance with one embodiment.

FIG. 3 is an overview diagram illustrating a user initiating the functionality of network 100 of FIG. 1 in accordance with one embodiment. In one embodiment, the user could use a website via user client/computer 109 to create a user account 102, set up the password for the account, and create a personal identification number ("PIN"). The user could also use the website to populate the user account 102 with a debit card 303, a loyalty card 304 and a coupon 305. Other tender instruments are possible. The user can then download a "mobile commerce" application to the user's client/mobile phone 108 and sign into account 102. At this point the user is ready to use network 100. Alternatively, the user can sign-up in a similar fashion through a retailer-branded web interface or mobile application.

Figure 4:
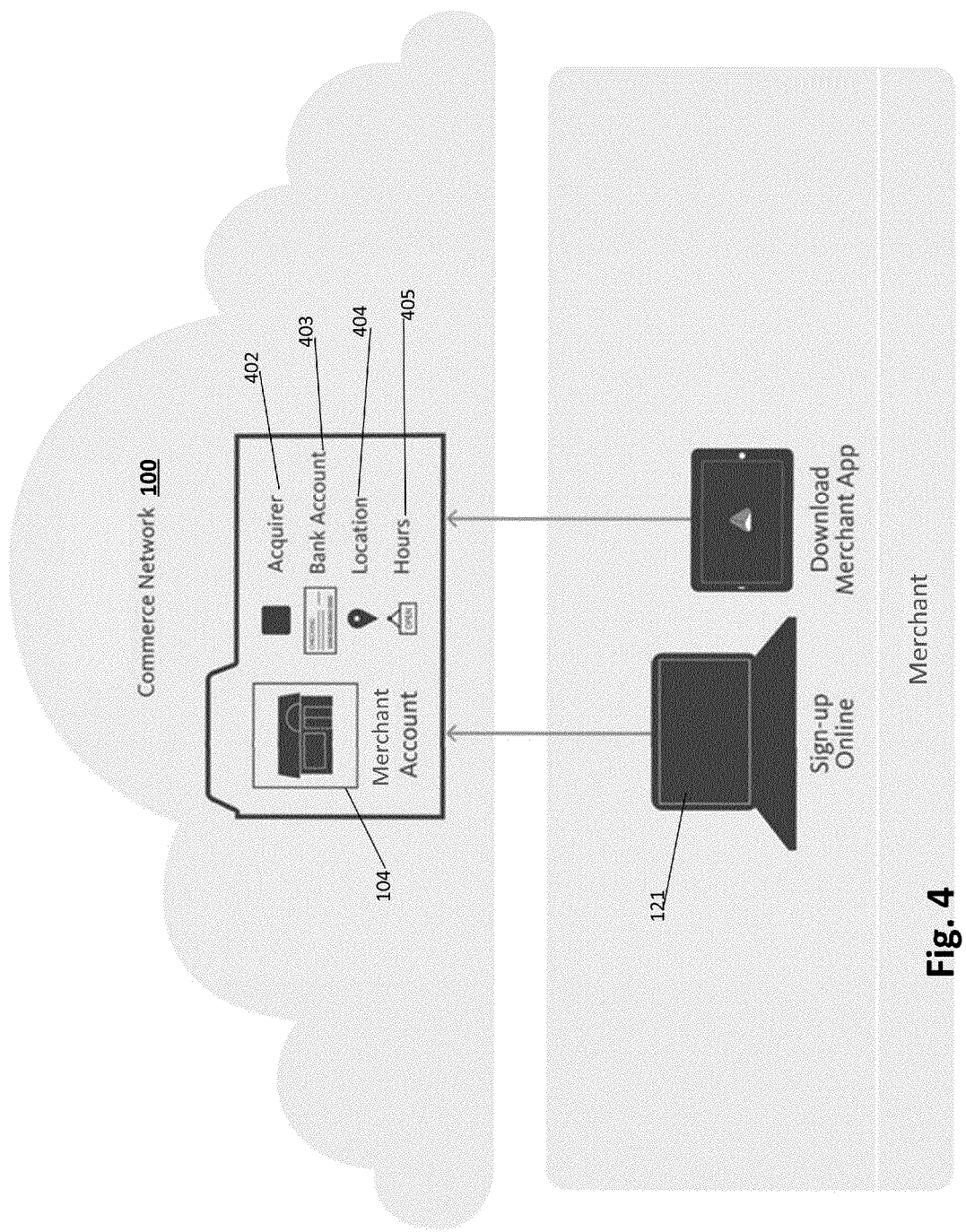
FIG. 4 is an overview diagram illustrating a merchant initiating the functionality of the network of FIG. 1 in accordance with one embodiment.

Similarly, to initiate the functionality of network 100, in one embodiment a merchant first creates a merchant account 104 representing the corporate entity and then creates store accounts for each physical store. FIG. 4 is an overview diagram illustrating a merchant initiating the functionality of network 100 of FIG. 1 in accordance with one embodiment. To accomplish this the merchant would use a web page via merchant client 121 or other method. In the example of FIG. 4, the merchant has a single store and creates merchant account 104 and a store account of the single location 404 having store hours 405. The merchant would add information to the store account describing how payments should be handled for that store location. Specifically, the merchant will designate which acquirer 402 and account 403 processed funds should flow into. Acquirer 402 is the merchant's acquirer, also referred to as a payment "processor". Examples of payment processors include First Data Corp. ("FDC"), Fifth Third Processing Solutions, etc. Account 403 is the merchant's corporate level account or the individual store's account on network 100.

Once the store account is setup, in one embodiment the merchant integrates a "Beanstalk Library" into the merchant's POS system. The Beanstalk Library allows the POS system/client 120 to initiate transactions on network 100, much the same way that these systems initiate transactions with a traditional acquirer. In one embodiment, the Beanstalk library combines the functions of the following known integration products:

Credit processing gateways (e.g., First Data Corp, Fifth Third, etc.);
    Processing solutions (e.g., Chase Paymentech, Heartland Processing, etc.);
    Gift card processing hosts (e.g., First Data Valuelink, Store Value Solutions ("SVS"), ValuTec, Givex, Mercury Gift Cards, etc.);
    Coupon redemption systems (e.g., NCH, Inmar, etc.);
    Loyalty providers (e.g., City Retail Services, SAP, TSYS, etc.);
    Voucher providers (e.g., Groupon, Living Social, etc.); and
    POS hardware platforms (e.g., NCR, Micros, etc).

Once integrated, POS 120 is ready to initiate payments on network 100. Payments initiated via a beanstalk API are processed as described by the rules set up in the store account for the physical store that initiates payment.

Figure 5:
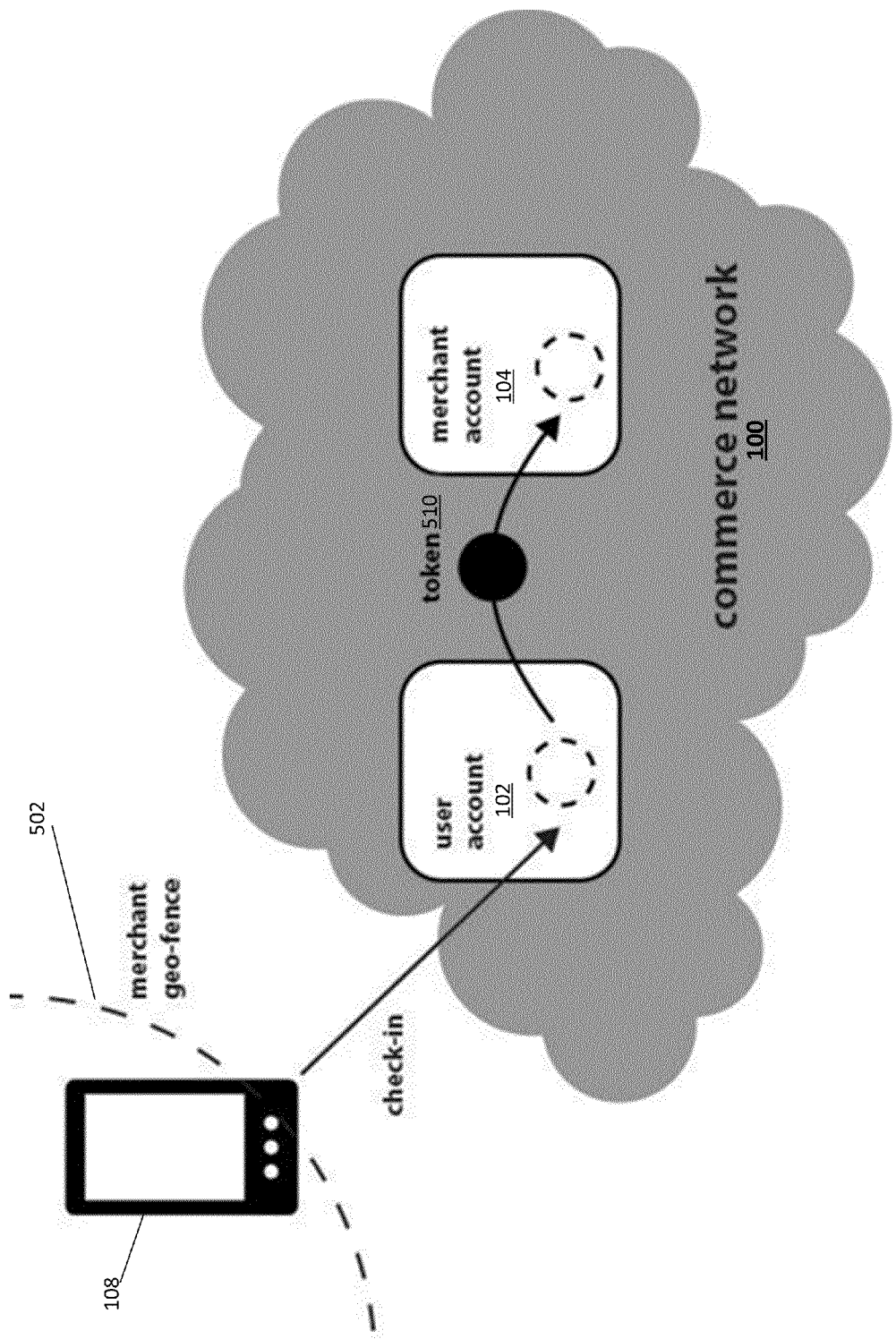
FIG. 5 illustrates a user being checked into a store with a store account in accordance with one embodiment.

Once at least one user and one merchant and store account, and one issuer has been set up, transactions can occur on network 100. FIG. 5 illustrates a user being checked into a store with a store account in accordance with one embodiment. The example beginning at FIG. 5 is for a transaction with a single item and a single payment instrument.

As shown in FIG. 5, network 100 via the mobile commerce application downloaded on the user's mobile device 108 observes the user's location and uses this information to determine when the user enters a store that has a corresponding store account on network 100. The downloaded mobile commerce application uses GPS signaling in one embodiment to determine when the user enters the store by crossing a merchant geo-fence 502. A geo-fence is a virtual perimeter for a real-world geographic area such as the store.

To prepare the user to pay at the store, the user mobile application sends a check-in request to network 100 indicating that network 100 should prepare the user to pay at the store. Network 100 receives the check-in request and creates a single-use payment token or "Bean" 510 for the user. Network 100 registers the token 510 with the store and replies to the user's mobile phone 108. If desired by the user, the mobile phone 108 can be programmed to buzz or otherwise alert the user to let the user know that they are ready to pay at the store. Similarly, if the manager at the store is looking at POS client 120 or Management Client 121, the manager will notice that another user has entered the store by an indication that pops up on client 120 or 121.

A Bean, such as Bean 510, in general is a session object that captures the interaction events between a user and a single store location. In one embodiment, a Bean object lifecycle begins when a user enters the store location and ends when a user leaves the store location. Other lifecycle initialization triggers and ending triggers are possible. For example, a Bean could be instantiated in an anonymous transaction by the store at the time of a transaction initiation, and closed when the transaction processing is complete. Bean 510 can be used for a single transaction, or it may be applied to a user session in a store that spans multiple refunds and purchase transactions.

Figure 6:
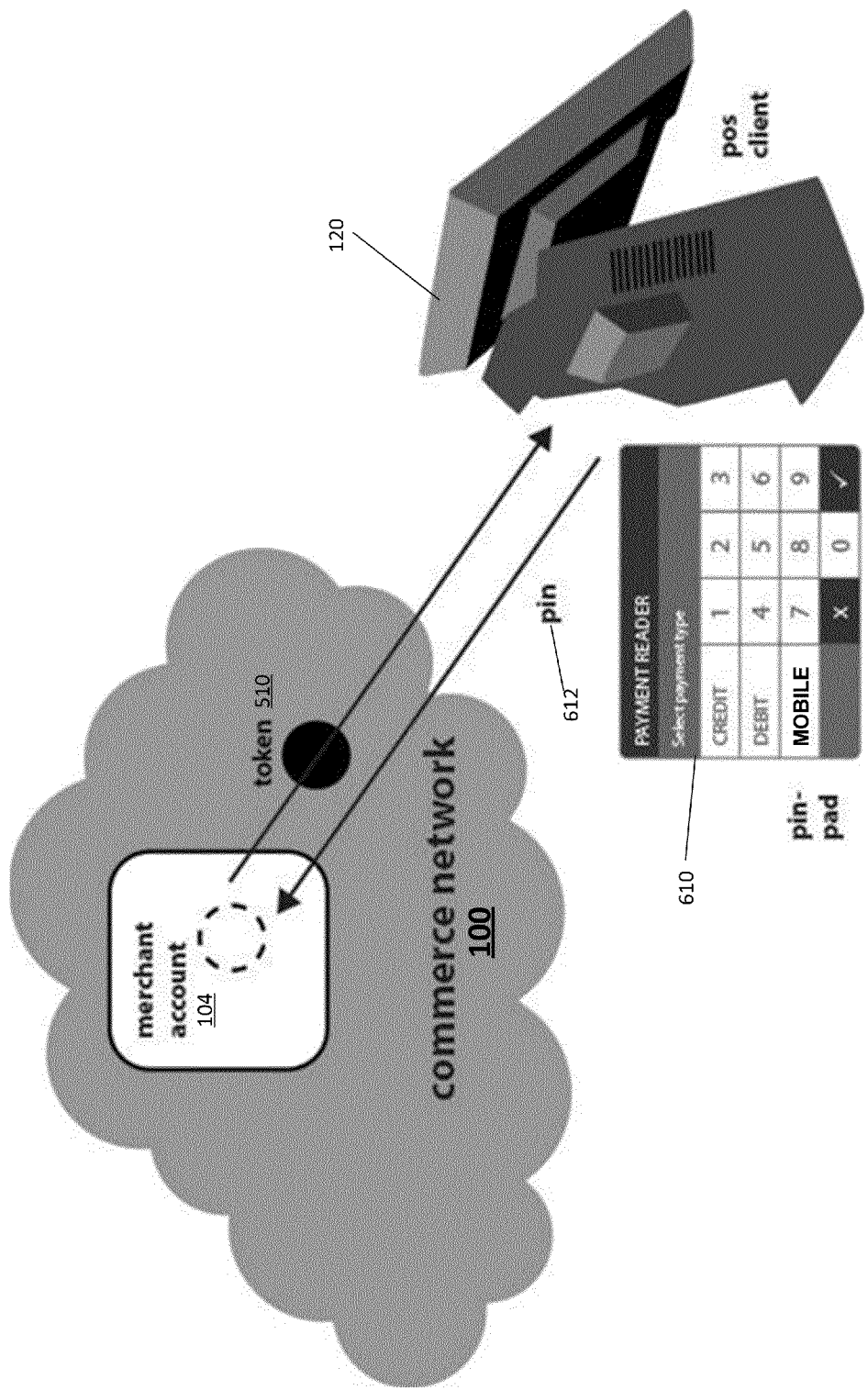
FIG. 6 illustrates a POS client at the merchant and using the merchant account to check out the user in accordance with one embodiment.

In the current example where the user purchases a single item, the user makes the selection of the item and heads to the checkout. FIG. 6 illustrates POS client 120 at the merchant and using merchant account 104 to checkout the user in accordance with one embodiment. POS client 120 displays multiple methods of payment on display 610, including credit and debit. One of the options is a "mobile" option indicating payment via network 100. As the cashier rings the user up, the user selects the "mobile" option and enters the PIN number in the existing PIN pad.

At this point POS 120 uses the integrated Beanstalk Library to authenticate the user via the PIN. To achieve this, the POS software passes the user's PIN into the Beanstalk Library and requests an authentication. The Beanstalk Library sends the request to network 100 where the user's PIN is used to validate the user. Once validated, the payment token 510 (that was created when the user entered the store) is returned to POS client 120. POS client 120 is now ready for checkout.

Figure 7:
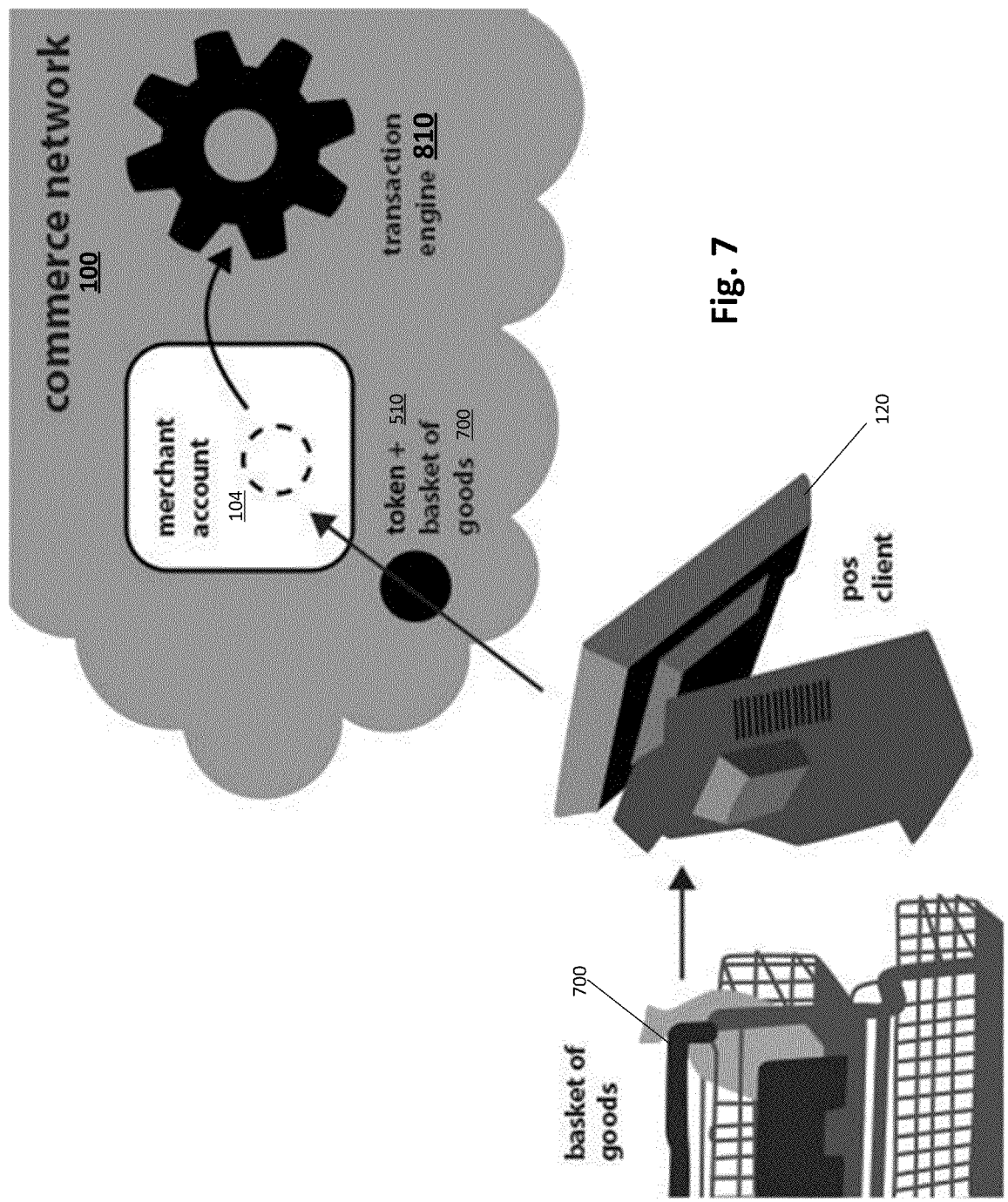
FIG. 7 further illustrates the checkout process based on a basket of goods selected by the user in accordance with one embodiment.

FIG. 7 further illustrates the checkout process based on a basket of goods selected by the user in accordance with one embodiment. The basket of goods 700 is the line level data of the one or more items that the user has selected for purchase. Basket of goods 700 includes a full description of each item, including the brand, price, size, stock keeping unit ("SKU"), etc. In general, the description includes the core information of SKU, price, tax and a list of additional key-value descriptors to cover item or merchant specific characteristics such as color, category, size, condition, etc. Once the cashier finalizes the transaction at POS client 120, basket of goods 700 that the user selected is passed into the Beanstalk Library. Basket of goods 700 (i.e., line level data) and payment token/Bean 510 are then sent to network 100 for processing.

Figure 8:
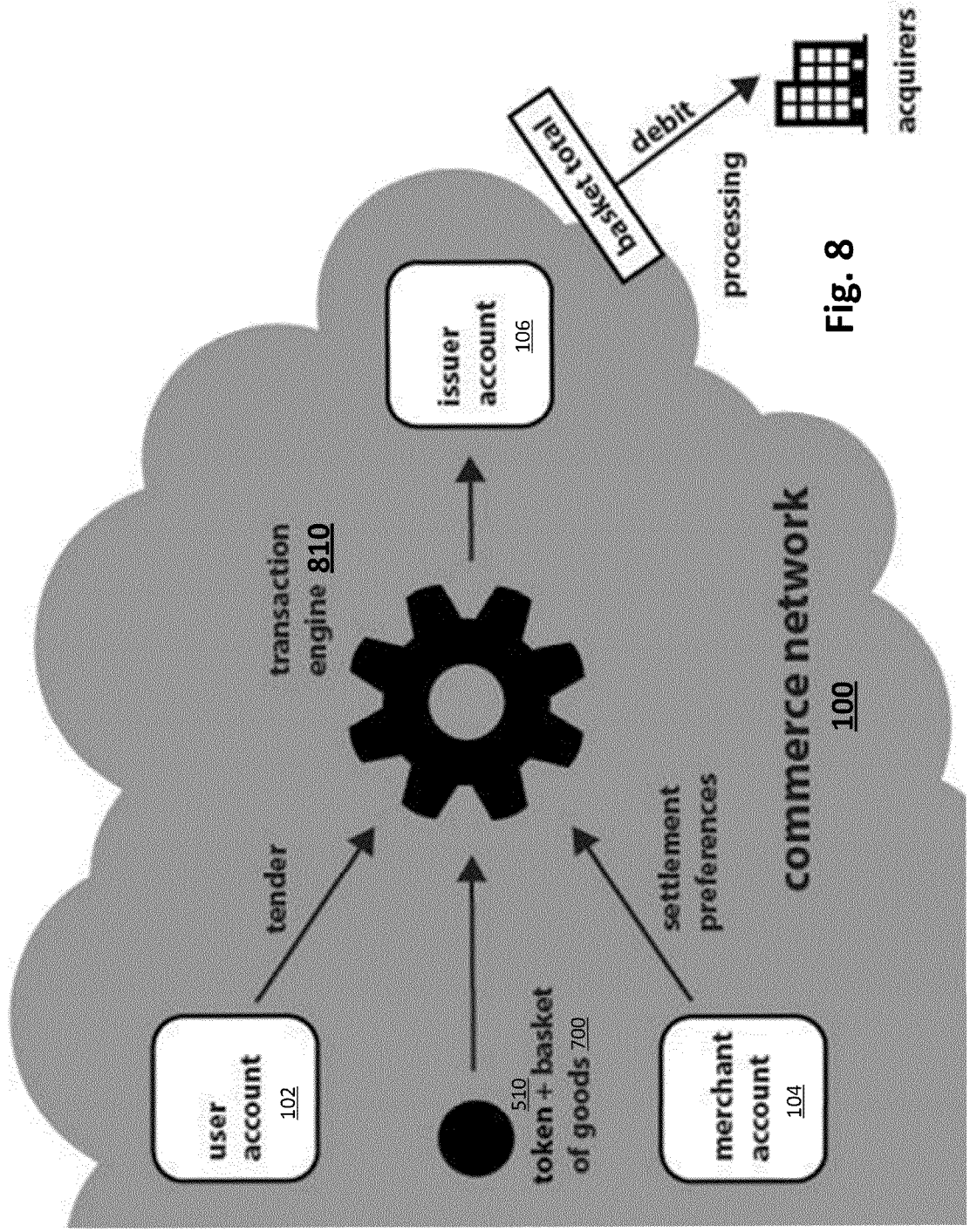
FIG. 8 illustrates the functionality of a transaction engine in accordance with an embodiment of the present invention.

When the transaction request reaches network 100 it is passed into a transaction engine 810. FIG. 8 illustrates the functionality of transaction engine 810 in accordance with an embodiment of the present invention. The checkout process is based on basket of goods 700 selected by the user and the corresponding line level data in accordance with one embodiment. Transaction engine 810 reviews the basket of goods 700 being purchased, compares them to the payment instruments in the user's user account 102, and selects the correct payment instrument(s) to use. If the user had any item-specific coupons, they would be applied here. However, in this example the user has no coupons and pays the full amount with the user's debit card.

Once transaction engine 810 has selected the payment instrument (in this example, the user's debit card), it looks up the store account's processing preferences. In this example, the store uses First Data Corporation, or other payment processor for processing. Transaction engine 810 sends a request to FDC, or other payment processor or partner, to put the full total of the transaction (e.g., $5.00) on the user's debit card and waits for the response.

Assuming the transaction is approved, transaction engine 810 sends a success response to POS 120. It then uses the basket of goods to create a digital receipt and notify the user of the purchase and an available receipt. Transaction engine 810 similarly creates a receipt for the store and updates its real-time analytics to reflect these sales.

Figure 9:
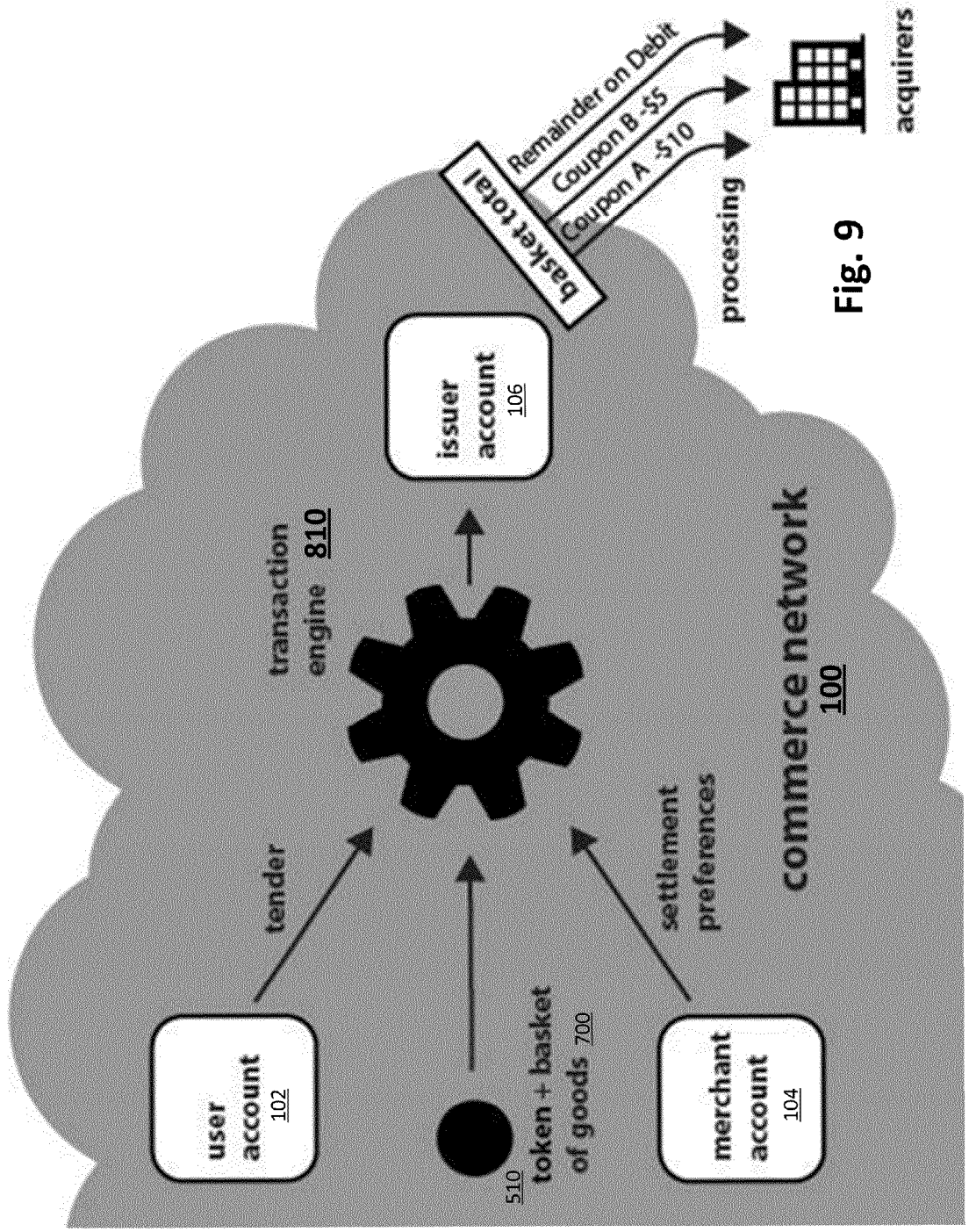
FIG. 9 illustrates the functionality of the transaction engine with multiple items and multiple payment/tender options in accordance with an embodiment of the present invention.

In a variation of the preceding example, assume the user has selected multiple items, and has manufacturer coupons in the user account 102 for two of the items: a $10.00 off coupon for "Item A" and a $5.00 off coupon for "Item B." In this example, the user's check-in and PIN authentication proceeds in the same manner as disclosed in the above example. However, when the transaction reaches network 100, it is processed differently. FIG. 9 illustrates the functionality of transaction engine 810 with multiple items and multiple payment/tender options in accordance with an embodiment of the present invention. When transaction engine 810 compares the basket of goods 700 to the user's user account 102, which stores the coupons, it matches Item A to one of the coupons, and matches Item B to the other coupon. Network 100 is able to do this because it has received line level data for the basket of goods from POS 120. It then applies these payment instruments to the basket alongside the debit card.

Once the tenders are selected, transaction engine 810 sends three transaction requests to the acquirer/processor:

A $10.00 Automated Clearing House ("ACH") payment from the Item A manufacturer to the store.

A $5.00 ACH payment from the Item B manufacturer to the store.

The remainder of the transaction is placed on the user's debit card.

Transaction engine 810 then waits for the PIN debit transaction to complete but not the ACH transactions, since they can take much longer to complete. Receipts are generated and they include information about the redeemed offers. If these offers were part of a specific campaign, the campaign analytics would be updated to reflect this usage.

As disclosed above, network 100 enables merchants to accept any and all forms of tender, to complete complex multi-tender transactions, and to effectively engage with customers across new channels. Specifically, transaction engine 810 joins user accounts 102, merchant accounts 104 and issuer accounts 106 to enable the flexible settlement of any type and any number of tenders for a single transaction. In turn, this flexibility empowers merchants to reach customers through new channels which require new incentives/tender types for effective engagement. For example, mobile web engagement might require the creation and distribution of mobile advertisements/offers, a "Facebook" engagement might require Facebook Offers or the distribution of Facebook Credits, and an e-mail marketing campaign might require the creation and distribution of e-mail offers/Groupon certificates, etc. By supporting any tender type, network 100 effectively unlocks these new channels to merchants and turns them into powerful and measurable paths to reach customers. The resulting platform provides a medium for users and merchants to seamlessly engage with one another and fosters rich multi-channel relationships. Network 100 allows merchants to promote, distribute, accept and analyze results for new tender types that most directly support their core business.

Figure 10:
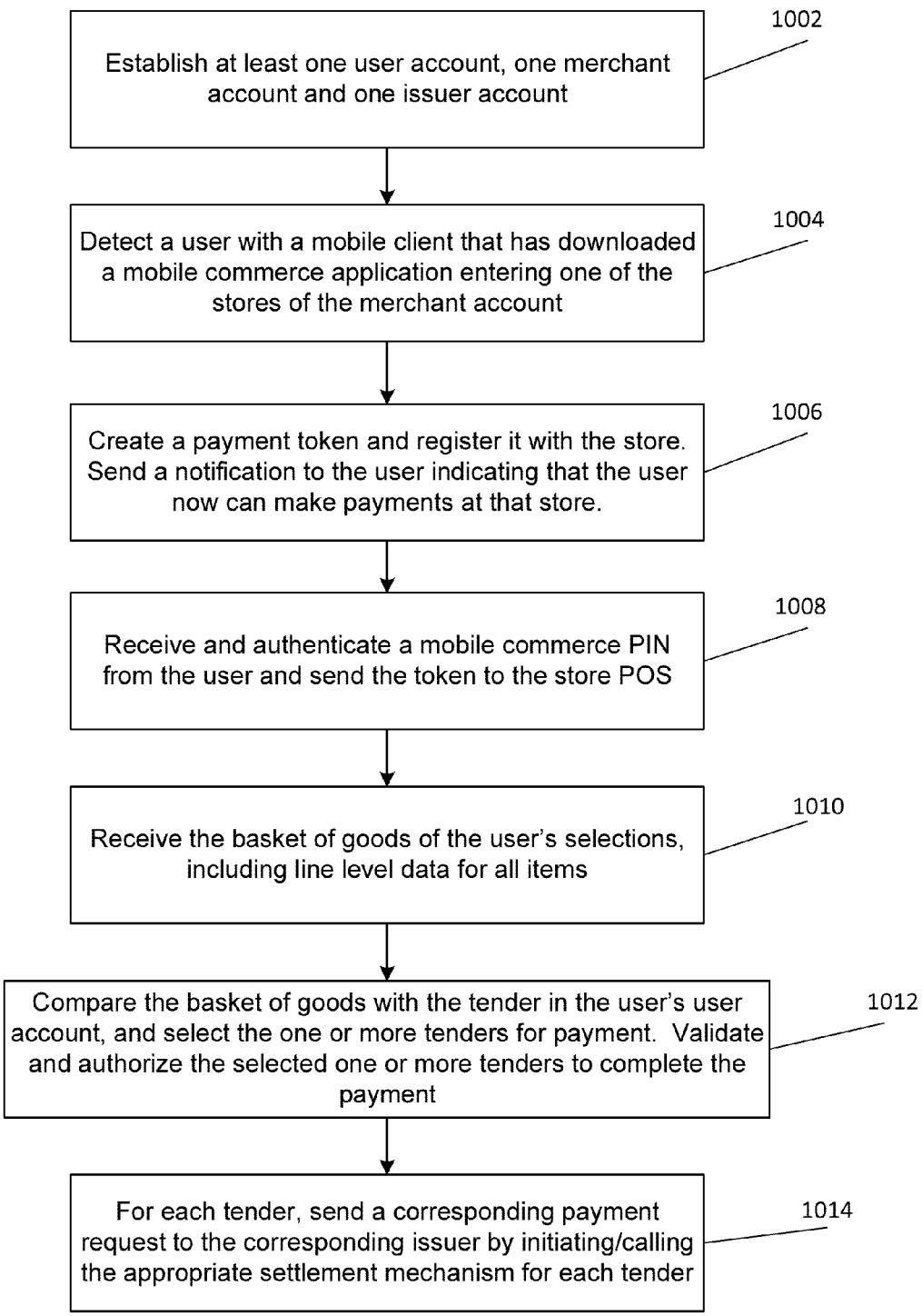
FIG. 10 is a flow diagram of the functionality of the commerce network module of FIG. 1 when providing mobile commerce and conducting a mobile transaction in accordance with one embodiment.

FIG. 10 is a flow diagram of the functionality of commerce network module 16 of FIG. 1 when providing mobile commerce and conducting mobile transactions in accordance with one embodiment. In one embodiment, the functionality of the flow diagram of FIG. 10, and FIG. 13 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. The functionality of FIG. 10 can be implement by system 10 as shown in FIG. 2, or distributed over multiple system 10s.

At 1002, at least one user account, one merchant account and one issuer account is established. Each user account holds basic profile information, payment preferences and one or more tender instruments, including debit cards, private label credit cards, gift cards, bank accounts, coupons, offers, loyalty cards, loyalty points, etc. Each merchant account holds basic information such as store address/location(s) and merchant acquiring information that defines how payment should flow to the merchant. Each issuer account may include an authorization policy, an authorization mechanism and a settlement mechanism for each tender type the issuer supports.

At 1004, a user with a mobile client that has downloaded a mobile commerce application, such as a smartphone, is detected entering one of the stores of the merchant account. In one embodiment, the user is detected when the user crosses a geo-fence of the store using the user's smartphone GPS capability.

At 1006, a token or Bean is created and registered with the store. A notification is optionally sent to the user indicating that the user now can make payments at that store. This is the completion of a first level of authentication. At this point, the store is able to communicate with the user via the mobile client, such as providing store information, advertisements, coupons, etc.

At 1008, after the user selects one or more items to purchase that form a basket of goods, the user approaches the store's POS, selects the option to pay using the mobile commerce network, and enters the mobile commerce PIN that was associated with the user when the user created the user account. The PIN is received by the commerce network 100 and is then authenticated at the network, and the token is sent to the POS in the store. This is the completion of a second level of authentication.

At 1010, the basket of goods of the user's selections, including line level data for all items, is received by the network 100 for processing.

At 1012, the basket of goods is compared with the payment instruments or tender in the user's user account, and the appropriate one or more tenders are selected, validated and authorized to complete the payment (referred to as tender "extraction"). The tenders can include debit cards, credit cards, electronic coupons, electronic group buying instruments such as Groupon "deals"/certificates, electronic gift certificates, etc. When more than one tender can be used to complete the payment, the "best" tender is selected. For example, coupons or gift certificates will be used before debit or credit cards, and the remaining balance, if not completely satisfied by the coupon or gift certificates, can be satisfied by the debit/credit cards.

At 1014, each of the one or more payment requests corresponding to the tenders are sent to the corresponding issuer by initiating/calling the appropriate settlement mechanism for each tender.

Users

As discussed above, every user of network 100 has a user account 102. User account 102 holds basic profile information, global and merchant specific payment preferences, transaction history, and any number and type of tender instruments including debit cards, credit cards, private label cards, gift cards, bank accounts, coupons, offers, loyalty cards, loyalty points, etc. The tender instruments in the User account 102 are accessible at the time of transaction and are used to facilitate payment in the order/fashion prescribed by the user. The desired use of instruments and the order in which they should be used is determined by the user in a user account preferences file. In one embodiment, these preferences may be set once and not modified again, or the user could manually adjust these preferences before each transaction.

Users can create, access and manage their user accounts 102 through a range of user clients (e.g., user clients 108, 109, or any devices that enable the user to interface with network 100). These clients include web pages, mobile applications, and tablet interfaces which enable users to add/delete tender instruments, view transaction history, and perform a range of other account management functions. User clients access user account data via commerce network 100 and present a consistent set of instruments across interfaces. For example, whether a user looks at the contents of user account 102 on web client 109 or on mobile client 108, the user will see the same set of instruments.

In one embodiment, a primary use for the user clients is adding and managing instruments of tender. When a user adds an instrument to user account 102, the instrument data is sent to network 100 for secure storage in user account 102. In one embodiment, once instrument data is added to user account 102, the data exists exclusively in user account 102 and is never shared with or stored in any of the clients. However, in one embodiment user account 102 shares instrument references with the user clients so that the clients can actualize a user interface that lets users examine, delete and configure the instruments in user account 102. Instrument references contain only enough information about the instrument in one embodiment to allow it to be meaningfully displayed in the user interface. Because the user clients do not store sensitive tender data, they are not a point of attack from which credentials may be extracted.

The user clients may also serve as points of user engagement and tender discovery before and after a transaction. For example, a merchant might present an offer to a user when the user arrives at a store to drive sales of an item that is overstocked, or a merchant might provide an offer attached to a receipt to incentivize the user to return to the store that same week. In these examples, the user clients also become channels for delivering rich personalized experiences and presenting new instruments of tender.

The user clients, such as user client 108, 109 are merchant-centric. Unlike some prior art mobile wallets that are organized around object types (e.g., payment credentials, offers/coupons, loyalty/reward cards, receipts, etc.), the user clients in accordance with one embodiment are organized around user/merchant relationships. By default, user account data is organized by merchants and this serves as a user client's organizing principle. The default view in a user client in one embodiment is a list of merchants organized by location, favorites or any other arrangement. Users can pivot data around themselves (e.g., to view receipts across all merchants) in another view.

Once a user retrieves a detailed view of a specific merchant, the user is able to see a view of their entire relationship with the merchant. This view, referred to as a "merchant relationship feed" is an intelligent sort of all past, present and potential future user/merchant interactions. An intelligent algorithm weighs recency, importance and other factors to develop a feed of transactions, offers, rewards, news and other user/merchant engagement opportunities.

Network 100 enables merchants to reach customers through new channels which often require new incentive/tender types for effective engagement (e.g., mobile advertisements/offers for mobile channels, Facebook Credits/Offers for Facebook "likes", etc.). Across these new channels, users generally engage while they are online and logged into a range of third party accounts such as Pinterest, Facebook, Google, Twitter and Yahoo. Network 100 allows users to link their user accounts to these third party accounts to enable seamless discovery, clipping, sharing and engagement with tender available on these channels. To create this link, in one embodiment network 100 uses "OAuth" to connect user accounts to these third party account. OAuth is a known open standard for authorization and provides a process for end-users to authorize third-party access to their server resources without sharing their credentials (typically, a username and password pair), using user-agent redirections. In other embodiments, other authorization mechanisms can be used. A user may elect to link user account 102 to any or all third party accounts made available by network 100.

When a third party account is linked to user account 102, it is granted a set of capabilities to interact with user account 102, which might include adding tender instruments into user account 102. For example, a user who is logged into Yahoo might clip an offer from an email message directly to the user's user account 102. Similarly, when a user account 102 is linked to a third party account, with user permission a user account 102 may interact with the third party account. For example, a user account 102 might gain access to post something to a user's Facebook Wall or Twitter Stream. This linking of accounts gives users a federated commerce capability with a broad online presence. The federated commerce capability actualizes a chain of authentication so that no matter what the online context, users are able to save to and publish from their user account 102.

While the above describes using account federation to add tender instruments from Twitter and Facebook, for example, this mechanism extends to any secure online account, including user accounts with financial institutions, media outlets and merchants. Therefore, a user logged in to a merchant or issuer website could similarly push things like offers or payment cards into their user accounts.

When a third party account is linked to user account 102, it is granted a set of permissions which can include the ability to add tender instruments to user account 102 (including debit cards, private label cards, gift cards, bank accounts, coupons, offers, loyalty cards, loyalty points etc.). To add instruments to user account 102, third parties can interact with a defined set of User Account APIs. With user permission, these third parties can then push instrument data to the user account. These APIs can implement using known web service mechanisms such as Representational State Transfer ("REST") and data payloads encoded as JavaScript Object Notation ("JSON").

If a user is not logged on to network 100 when trying to save a new instrument to the user account 102, the user will be prompted to login to network 100 or any third party account. Similarly, if a user is already logged into a third party account that is not yet federated to user account 102, the user will be prompted to link that account to user account 102 or to login using a valid user account 102.

For mobile applications where an application may not use the notion of a "logged in" account (e.g., an advertisement in a video game), the client application exposes local APIs by which an application may pass data to the client application to be saved. In this embodiment, federated authentication is provided by the client installed on the user client. In one embodiment, an intent or uniform resource identifier ("URI") exchange is used to pass tender data into the client application which will receive and save the instrument data.

In one embodiment, user account 102 plays a large role in the settlement of tender at the time of a transaction. When a user makes a purchase, the merchant passes the user authentication token 510, also referred to as a "Bean", loaded with a basket of goods to network 100. Network 100 uses token 510 to access user account 102 and passes the basket of goods and user account 102 to transaction engine 810 for processing.

Transaction engine 810 examines the basket of goods and full set of instruments in user account 102 and applies a business algorithm to determine which tender instruments to use for the transaction. Transaction engine 810 then initiates the transaction and updates user account 102 as necessary. For example, offers that are redeemed to settle the transaction would be marked as used. Further, if a gift card is used in a transaction, its balance would be updated in user account 102.

The online and federated nature of user account 102 enables it to: (1) gather tender instruments from any online context; (2) make those instruments available for processing at the time of transaction; and (3) update user account 102 after transaction processing so that the user can immediately see the results of the transaction.

Merchants

As previously discussed, in one embodiment every merchant that participates in network 100 has a merchant account 104. Merchant account 104 holds basic profile information, an arbitrary number of stores which represent physical locations for the merchant, geo-fence properties for each store, merchant acquirers/processors used to finalize settlement of acceptable forms of tender, etc. In addition, merchant account 104 may hold any merchant specific business logic that should be applied to transactions.

To provide flexibility, embodiments allow merchants to arrange stores into arbitrary sets/store groups (e.g., regional groups) to simplify the management tasks. A merchant can then use these groups to set store policies or publish incentives/offers in varying granularities. For example, a merchant could publish a national offer to all stores, a warm weather offer to a group of warm weather stores, a local offer to a single store or individual offers to specific customers or customer groups, based on any range of demographics, historic purchases, online browsing, or other characteristics or actions.

Store groups can also be used to delegate administrative permission for the stores. For example, a regional manager could be given permission to set offers/store policies for a regional store group or a local store manager could set policies and promotions for one store only.

Merchants can connect to network 100 to authenticate users and initiate transactions through approved merchant POS clients, such as POS client 120. These merchant POS clients may include existing and future POS infrastructure which is connected to network 100 via merchant APIs 122. In order to authenticate users and initiate transactions, a POS in one embodiment first authenticates itself to network 100. This initial authentication includes an exchange of merchant account 104 username, password, and predefined POS identifier (e.g., "Lane 17"). In addition, key material is also exchanged with the POS to more strongly authenticate it.

Once authenticated, merchant POS client 120 (via API 122) is used to authenticate in-store users to network 100. When a user elects to pay using network 100, the user is prompted to enter the PIN on the terminal attached to the POS. For example, the terminal might be a PIN-pad from Verifone Systems Inc., or a touch-screen PIN-pad when using a tablet/mobile POS. Once the PIN is collected, it is sent to network 100 where it is compared to the PINs of users checked into the store. Therefore, the PIN is used both to authenticate and disambiguate the user. If there are multiple users with the same or even similar PINs in the store, network 100 in one embodiment presents a challenge question to the user. For example, the user may be asked to enter a date of birth, street address number, phone number or other information into the same terminal. This information would then be similarly passed to network 100 for authentication.

Once a user is authenticated, as described, the POS receives a token, or Bean, for the transaction at hand. The Bean is an opaque token that carries no intrinsic value and does not return any tender instruments to the POS. Accordingly, the Bean does not require any PCI security standards council or similar level protection by the merchant.

Once the user has authenticated to network 100 via the POS, the cashier/teller at the POS moves forward with the merchant's standard purchase flow until it is time to complete the transaction. With a traditional transaction, the POS/cashier would send a user instrument (for example a Visa card) and a basket total (for example $100) to a network for authorization and settlement. However, for network 100, the cashier sends the token/Bean which includes the complete basket of goods including line level data to network 100. With the basket of goods as a guide, transaction engine 810 then joins the user, merchant and issuer accounts to process the transaction. Once cleared, network 100 returns an updated receipt to the POS including any price modifications. This enables the user have a real-time view of the final purchase price and confirmation of which instruments were applied to clear the transaction.

Merchants can create, access and manage their merchant accounts 104 through a range of merchant clients (e.g., management client 121). These clients include web pages, mobile applications, and tablet interfaces which enable designated managers to monitor their merchant account, add/delete stores, view transaction history, and perform a range of other account management functions. A management console provides merchants with a real-time view of activity in their stores and across channels, such as how many customers are in their stores segmented by customer type, subject to user permission, or a customer's individual wish lists or purchase history. Additionally the management console provides a real-time view of purchase velocity, the performance of promotional campaigns, and custom monitoring/alerts based on any information available on network 100. The management console also provides access to the business optimization engine, which can be used to optimize and generate personalized advertising, incentive, and promotional campaigns across channels to maximize revenue and customer engagement.

Issuers

As disclosed above, every issuer of network 100 has a corresponding issuer account 106. Issuer account 106 details the issuer's tender types, and the authorization policy, authorization mechanism, and settlement mechanism for each form of tender. An authorization policy is a contract that describes how and under what circumstances authorization for the tender should occur. An authorization mechanism describes how the tender should be authorized by the issuer should the authorization policy deem it necessary. Finally, the settlement mechanism describes how settlement should be actualized for the tender. In one embodiment, network 100 splits the authorization and settlement of tender into separate phases to provide a flexible solution capable of handling a broad set of tender types.

For example, if Groupon were to issue an offer that could be redeemed on network 100, Groupon would first create an issuer account or an account is created on behalf of Groupon. Groupon would specify an authorization policy, an authorization mechanism, and a settlement mechanism for the Groupon tender. Groupon could specify: (1) an authorization policy that required real time authorization for any Groupon tender; (2) an authorization mechanism that used a web services call to perform the authorization for the tender; and (3) an ACH settlement mechanism that used ACH to move the money from Groupon to the merchant. In some transactions, authorization and settlement could be part of the same action for a specific tender type. For example, the authorization mechanism could be set to null in the issuer account, which would shift the responsibility of authorization to the settlement agent.

For traditional payment instruments where the issuer (e.g., a bank) may not be have a corresponding issuer account on network 100, a delegate issuer account may be automatically configured. For example, a debit card would use a pre-defined debit Issuer account delegate that would specify authorization and settlement using a traditional debit network.

An issuer can use an issuer management console or other method to facilitate the setup of issuer accounts 106 and management of the authorization policy, authorization mechanism, and settlement mechanism for each tender. The issuer management may also provide real-time analytics about issuer tender on network 100, the number of transactions inflight, the outstanding balance due, settlement, etc.

The authorization and settlement mechanisms specified for use by the issuer can be implemented in a number of ways. Embodiments include a set of issuer APIs 132 and reference implementations that use next generation authorization and settlement mechanisms. For example, when using Groupon-based tender, as described above, in one embodiment Groupon would use the authorization mechanism defined in issuer API 132 to implement authorization via a web services call.

Validity Score

In one embodiment, network 100 executes a machine learning algorithm over data it collects and combines the results with a prediction algorithm to provide a "validity score" for all participants and tenders involved in a transaction. The validity score is used in conjunction with the authorization mechanisms for tender types that support explicit authorization. If a validity score is insufficient for any tender or participant in the transaction, the transaction is either flagged or declined.

The validity score allows network 100 to enable settlement using a broad set of instruments. The validity score prediction algorithm uses machine learning to weigh all aspects of a transaction. As network 100 sees more and more transactions, the prediction algorithm improves and the machine learning model becomes trained resulting in improved accuracy. The quality and quantity of data combined with a scalable machine learning approach give network 100 the enhanced ability to predict the validity of all components of a transaction. In one embodiment, validity scoring enables network 100 to recognize and flag anything from bad tender, to a suspect user, a bad retail lane, or cashier that exhibits fraudulent characteristics. In one embodiment, the validity scoring includes velocity checks, including frequency of transactions and failed authentication attempts, location signals including a device location history, and a total amount charged, including single high value transactions or high spend per day. The same characteristics can be used to identify abnormal merchant/POS behavior.

Authentication

As described above, embodiments uses a two factor/level authentication system to verify a user's identity and initiate a transaction. The first factor of authentication is a user's geo-location. Specifically, the user's smartphone or other mobile client must be physically present in the store to initiate a transaction and the user client (i.e., a mobile commerce application) must be installed. To make this possible, in one embodiment a user configures the user client to login to the user's user account 102.

Once authenticated, the mobile user client examines all location information and uses a check-in algorithm that runs on the mobile device to decide when to send a check-in request to network 100. When the user client sends the check-in request to network 100, it includes all the location information available to the user client. Network 100 analyzes the request and returns both a decision (checked-in or not), and new data that will help the user client make better localized decisions in the future. The dynamic exchange of information between the user client and network 100 lets the system learn and constantly improve the accuracy of its geo-fence capability and notice/adjust to any attempts to fraudulently manipulate location signals.

The second factor of authentication is typically a PIN that the user knows and enters into the POS when the user is ready to initiate a transaction. If for any reason a transaction is flagged/raises fraud concerns, network 100 can challenge the user to answer questions/provide additional factors of authentication.

Network 100 uses multiple factors of authentication to verify the identity of the user in-store. This in-store authentication gates the initiation of any transaction on behalf of the user. Once a transaction has been initiated, network 100 seeks to further validate the identity of the user by leveraging machine learning and the user's location, location history, purchase history, and recent behavior to generate a validity score for the user. If for some reason the user validity score is too low, network 100 can issue challenge questions to the user to confirm the user's identity.

Merchant infrastructure is secured using key exchanges and cashier/teller login to merchant endpoints. For each transaction, network 100 seeks to validate both the authenticity of the merchant's endpoint and the legitimacy of the behavior originating from that endpoint. If a merchant endpoint is being used to purchase merchandise that the merchant does not stock, or a merchant endpoint is being used to purchase volumes of goods that are unusual, the transactions and/or endpoints can be flagged. Likewise if an invalid or uncommon discount were applied incorrectly or inappropriately, the transaction, teller and/or endpoint can be flagged.

To handle transactions and endpoints that were flagged for unusual behavior, the merchant can specify a policy in merchant account 104. For slightly odd situations, the merchant could simply request the opening of an audit log. For more serious issues, the merchant could require a manager override for the transaction to complete. Since merchant APIs 122 provide merchants with the ability to pass a teller ID along with the basket of goods, these mechanisms could similarly be used to detect dubious teller behavior.

Authorization

Network 100 sits at the intersection of transactions that span users, merchants and tender types. For each transaction, network 100 considers a wide cross-section of data including basket contents, location, time of day, consumer purchase patterns and merchant signals like checkout lane, teller, etc. Network 100 executes a machine learning and a predictive algorithm across this data to derive a validity score as described above. The validity score for all aspects of the transaction including the tender is combined with the authorization mechanisms described below to provide robust authorization implementation.

For a tender like ACH that does not have an explicit authorization mechanism, network 100 internally evaluates whether or not to accept the tender. In this scenario network 100 must decide to accept or decline the transaction based on the validity scores of the tender and other components of the transaction. Network 100 supports a configurable policy that lets the bearer of liability (in the case of ACH, the merchant) configure thresholds for validity scores and dollar values. For example, a merchant might tolerate a range of validity scores for small purchases but demand very high validity scores for large purchases.

In addition to top down validity scoring, issuer defined authorization policies and mechanisms are also used to authorize each tender instrument. For example, to determine if a Groupon "certificate" can be used for settlement, network 100 would combine the results of a Groupon authorization web services call with the tender's validity score.

Traditional instruments like PIN-debit and private label networks have built in authorization mechanisms including PIN, address and/or phone number verification. For these traditional forms of payment, authorization is performed at the same time as settlement. When authenticating these forms of tender, network 100 relies on the validity score calculated for the tender and performs the tender's explicit authorization as part of settlement. When settling PIN-debit, for example, the PIN would be passed with the card number to the PIN-debit network as part of the request for settlement. For a private label card the settlement mechanism may pass the user's address and phone number to the private label issuer as additional authorization signals for the private label network. For newer tender instruments, the authorization and settlement will likely be more clearly divided and the settlement mechanism will only perform settlement in one embodiment.

Embodiments can process multiple different forms of tender in a single transaction. As the number of tenders per transaction increases, keeping transaction latency low can become increasingly difficult, as the transaction will be as slow as the slowest form of tender. To authorize this mixed bag of tenders and ensure timely transactions, embodiments include a number of mechanisms that let network 100 pre-authorize certain tenders before they are used in a transaction.

Pre-authorization is the act of authorizing a tender without the immediate expectation of settlement. Pre-Authorization removes the tender issuers from the critical processing path while employing a number of mechanisms to ensure the tender security is not compromised. The ability to pre-authorize is based on embodiments that decouple authorization from settlement. The pre-authorization and transaction history of tenders provides critical data for the machine learning algorithms.

Embodiments may include a number of pre-authorization mechanisms that are not mutually exclusive. Any number of these mechanisms may be used alone or in combination to validate a single tender. In addition, these mechanisms may be used repeatedly during the lifecycle of a tender.

One pre-authorization mechanism authorizes an instrument when it is added to user account 102. This could be a blocking/gating operation by which tender instruments are only allowed in user account 102 after passing an authorization check. This is an aggressive form of authorization where network 100 validates the health of tender as it is enters the system.

For tenders that have second factors of authentication, another pre-authorization mechanism can be used to verify not just the validity of the tender but also the user's ownership of the instrument. For debit cards, network 100 uses the PIN in this capacity. When a user adds a debit card to user account 102, network 100 performs an authorization not just to confirm that the card is valid, but also to confirm that it is the owner entering the card.

The pre-authorization on entry to prove validity mechanism described above ensures that instruments added to user account 102 are valid on entry, but additional validation may be required as instruments age. Embodiments can scan user accounts and re-authorize instruments that have not been authorized for some duration of time. For example, if a Groupon voucher/certificate is validated on entry, network 100 could choose to re-authorize the voucher after an initial authorization expires.

If the user had printed out the Groupon offer and redeemed it manually, then network 100 would receive a "used/not valid" response from Groupon and mark the voucher used in user account 102. Periodic re-authorization would be accomplished by rescanning all tender and sending batches of low priority authorization requests to Groupon.

The check-in aspect of the two-factor authentication system of embodiments of the present invention provide an opportunity to pre-authorize tender in user account 102. When the user checks-in to the store, network 100 can kick-off a pre-authorization of all the tenders in the user's user account 102 that may be applied at the store the user checked into. In most cases, the user will be in the store for at least a few minutes before making a purchase, which provides a window of opportunity for network 100 to re-authorize and verify the validity of any instruments that may be used as part of an upcoming transaction.

While the mechanisms described above can improve the latency of real-time transaction processing, many of these mechanisms may be used for any/all tender types in an account or across network 100 to improve the security of the system. For example if a number of bad Groupon certificates were observed, network 100 can interpret this as a compromise of Groupon and choose to re-authenticate all Groupon tenders to assess the situation. Similarly if a specific user was flagged for unusual behavior, network 100 could choose to pre/re-authorize all of the user's tenders to see if the user was potentially a fraudster trying to utilize bad tenders.

Regardless of the validity score or level of pre-authorization, network 100 can choose to fully re-authorize tenders at the time of transaction. In the event that authorization cannot be performed in real-time (e.g., the issuer is experiencing downtime), network 100 can leverage the tender validity score to make an authorization decision about the tender's legitimacy. For example, if an offer were pre-authorized a week ago, and the tender validity score is high, network 100 could proceed with settlement under the assumption that the tender is good. This mechanism of falling back to local authorization mechanisms of network 100 when real-time authorization fails is referred to as "authorization fallback."

Embodiments further include a tunable fallback policy that describes how and when authorization fallbacks should be used. The bearer of liability configures the fallback policy with acceptable thresholds for tender validity scores, time since last successful authorization/pre-authorization, etc. In the case of a low value coupon, the expectation would be that the manufacturer (i.e., issuer) would be liable for the coupons and would set relatively permissive thresholds since the cost of a bad coupon would be very low. Conversely if a merchant accepted private label and shoulder liability, it might set very high validity thresholds for the private label tender. The merchant could even set validity thresholds that varied by dollar amount to minimize its risk.

Settlement

To accept payment, in one embodiment merchants must specify an acquirer configuration in its merchant account 104. The configuration can be as simple as an acquirer name and account or as complex as a set of acquirers and accounts and a policy about which acquirers should be used for which tender types. This configuration would likely include a raw merchant account endpoint to be used for transactions that did not explicitly require an acquirer.

For each tender issued, in one embodiment the issuer must specify a settlement mechanism in the issuer account 106. For legacy tenders, these mechanisms are interactions with legacy networks such as the PIN-debit, private label or credit networks. For newer forms of tender, these mechanisms may be ACH or even direct settlement where/when supported by issuers. Regardless of the tender, it is the settlement mechanisms affect settlement by initiating the movement of money between two endpoints but never take direct possession of money.

As described above, when a user client initiates a check-in, network 100 creates a secure session token or "Bean" that is registered with merchant account 104. The token contains a reference to the store and user and the token is referenced within merchant account 104 by the user's PIN. When the user enters the PIN at the merchant's POS to initiate a transaction, the PIN is used to lookup the token for the user. This mechanism therefore uses the PIN both to authenticate the user and also to disambiguate the user from other in-store users.

When the user enters the PIN to authorize a transaction, a token is returned from network 100 to the POS. The POS adds the basket of goods to the token and sends it back to network 100 where the basket is fully constructed and the transaction is ready for processing. The token is used by network 100 to facilitate processing. Finally, when the transaction is complete, the token is turned into a receipt. The token is the transactional entity that ties the user, merchant, basket of goods and issuers together for the lifecycle of an individual transaction including post-purchase actions such as returns.

Transaction Engine

Transaction engine 810, as described above, uses user account 102, merchant account 104 and the basket of goods to derive payment from a set of issuer accounts 106. Transaction engine 810 in one embodiment divides the work of processing a transaction into three distinct phases: a business logic phase, an authentication and authorization phase, and a settlement phase.

The business logic phase is the initial phase of a transaction in which transaction engine 810 looks at all instruments in the user's user account 102, the tender types the merchant accepts, the items in the basket of goods, which include line level data, and decides how to process the transaction.

Transaction engine 810 first looks at user account 102 and gathers all the forms of tender. It then organizes the forms of tender based on the user's stated preference for tender use at the specified merchant. Forms of tender that the user does not want to use are removed from the list of potential tenders.

The list of potential tenders is then filtered based on any restrictions the merchant may have. If the merchant for example is not willing to accept a form of tender it is removed from the list of tenders to be used for the transaction. Merchants set tender acceptance policies and users may always manually select tender preferences (e.g., universal default tender, default tender by merchant, etc.). However, embodiments can also dynamically and intelligently select user tender for each transaction without any required user action.

Transaction engine 810 then applies the tenders to the basket of goods seeking to honor the order of tender priority and best possible tender outcome. This may require relatively complex determinations as some tender types have complex rules and the outcomes of these rules must be compared (i.e., is a "2 for the price of 1" coupon better than a "2 for $5.00 coupon"?). As the basket is processed and tenders are applied, any tender specific policy is also preserved. For example most coupons are not eligible for stacking and some rewards programs may be applied only to certain products.

Transaction engine 810 applies all tenders until the basket of goods is qualified for settlement. This process may take many iterations and include many tender types as a single basket may be funded by coupons, loyalty rewards, pre-paid offers, multiple gift cards and a private label card, debit card, etc. Transaction engine 810 in one embodiment can enable split tender of not just 2 or 3 but an unlimited number of instruments.

At this point the business logic phase has completed, the set of tender instruments has been chosen, and transaction engine 810 moves onto the authentication and authorization phase. In this phase, transaction engine 810 leverages the authentication mechanisms described above to validate all participants in the transaction, and the authorization mechanisms described above to authorize all tenders to be used in the transaction.

To verify the user and merchant, the user and merchant authentication mechanisms are used, and in the case of insufficient validity corrective action is taken. For a weakly authenticated user, challenge questions are issued, or for a weak merchant endpoint score, the merchant authentication policy is followed.

To verify the validity of selected tenders, transaction engine 810 resolves the issuer account for each tender and performs the authorization action specified by the authorization policy in issuer account 106. The authentication and authorization phase ensures that the user, the merchant, the basket of goods and the tender instruments have all been validated before moving on to the settlement phase.

In the settlement phase, transaction engine 810 settles the set of tenders that have been specified for the transaction. To settle tenders, transaction engine 810 resolves the issuer account 106 for each tender, looks up the settlement mechanism and executes the settlement.

Network 100 allows merchants to specify a mechanism by which they should receive payment and issuers to specify an agent that should be used to settle outstanding balances. Network 100 in one embodiment does not take control or hold money at any point during the transaction.

Transaction engine 810 in one embodiment uses a phased approach to processing transactions in order to separate business logic, authentication/authorization and settlement from one another. As a consequence, the authentication and authorization phase of the transaction validates more than just the tender as transaction engine 810 validates all aspects of a transaction regardless of the tender instrument(s) used to settle the transaction. Therefore, transaction engine 810 makes it well suited to support tenders with weak or no authorization mechanism. Conversely, instruments with stronger authorization mechanisms (e.g., PIN debit) are made increasingly secure by the added layers of validation.

One embodiment allows users to modify tender selection even after a transaction has been settled. For example, if a user accidentally applied a 20% off offer to a $10 basket, the user might prefer to save the offer for the larger transaction. Embodiments let the user modify the tender selection and re-settle the transaction by choosing to pay the merchant an extra $2 and to have the offer marked as unused. Similarly, if a user wanted to move a purchase from a debit card to a line of credit, or from one line of credit to another line of credit the same mechanism could be used. This post-settlement modification mechanism will depend on merchant and issuer policies As described above, when conducting a mobile transaction with network 100, each user is uniquely identified per transaction by user account 102 as a result of the user downloading the mobile commerce application, as described above in conjunction with FIG. 3. Therefore, user specific analytics can be conducted on the mobile transactions. However, users that use traditional payment methods such as credit and debit cards to conduct transactions may not have a corresponding user account 102. Therefore, embodiments of commerce network 100 collect data and provide analytics across all customer data, regardless of the payment mechanism.

Specifically, in addition to supporting mobile transactions as described above, embodiments also support a "traditional transaction" mode that accommodates all forms of payments, including credit and debit cards and cash payments. When this mode is enabled, POS client 120 of FIG. 1 can aggregate data for every transaction that passes through it.

Credit Card

In the case of a credit card or debit card transaction or any type of transaction instrument that has an identifying number, a card hash (i.e., an encryption of the card number) or hash of a non-card number is passed into the Beanstalk library. The card hash is then used as a payment token instead of the token/Bean 510 described above that is used for mobile transactions.

When a traditional transaction token reaches commerce network 100, the card hash is used as a user identifier and the transaction data, including line level for all items, is captured for the user. Every time a customer uses the same credit card, the transaction is added to the same user account. While this user remains unknown and unreachable for marketing purposes, the user account provides a picture into the historical behavior of a user across multiple visits in which the same card is used.

Cash

In the case of a cash transaction, a cash identifier is created that is coupled with a timestamp to serve as a marker for an anonymous transaction. When an anonymous cash transaction reaches commerce network 100, the transaction is recorded as part of a unique single-use account.

Parallel Embodiment

Figure 11:
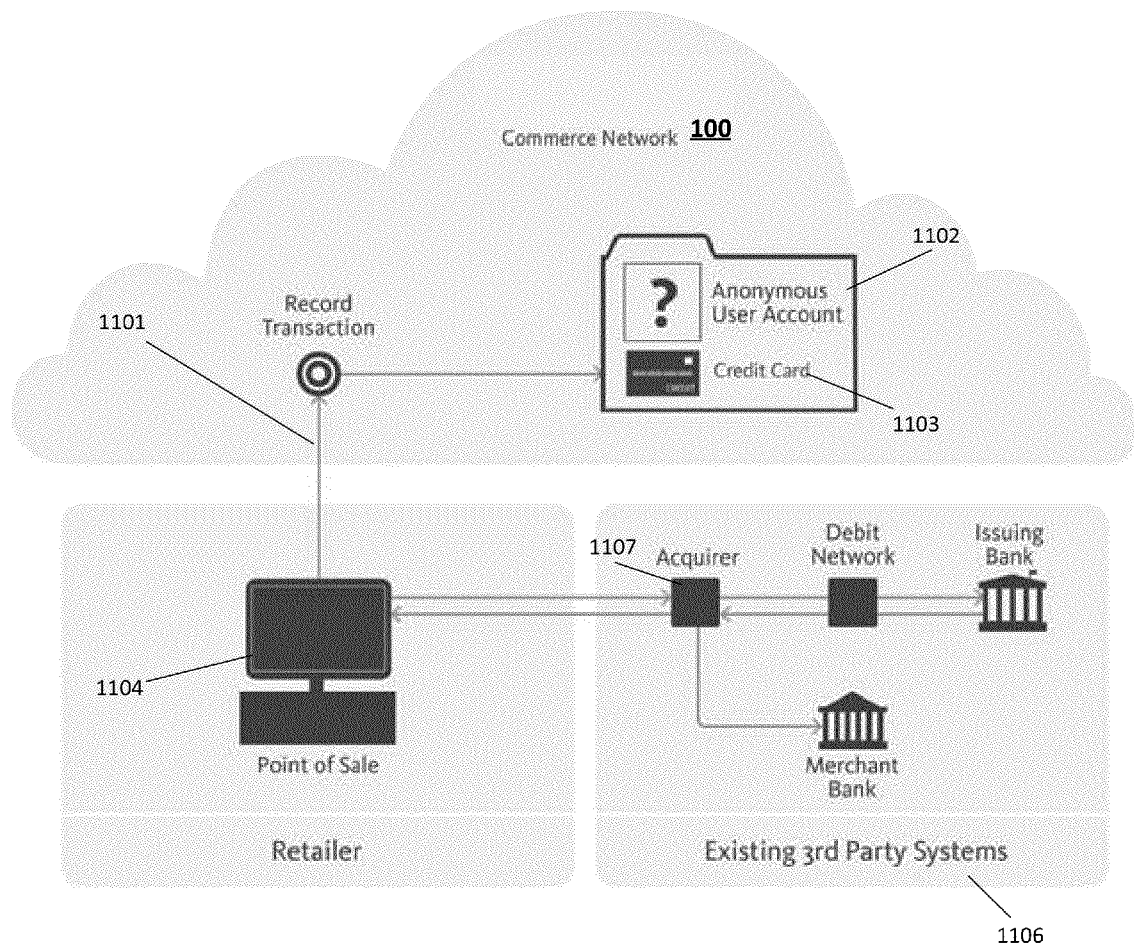
FIG. 11 illustrates a parallel implementation to capture the user data in accordance with one embodiment.

While embodiments do not modify aspects of the traditional transactions from the user's perspective, the captured user data is valuable for the retailer. FIG. 11 illustrates a parallel implementation to capture the user data in accordance with one embodiment. In the embodiment of FIG. 11, a retailer's POS 1104 initiates payment processing with the retailer's acquirer 1107, similar to with any type of transaction. However, in addition to initiating payment processing, POS 1104 also sends to commerce network 100 at 1101 the card hash and the basket of goods/line level data of the transaction. This enables commerce network 100 to record the transaction without having any impact on the existing payment process. The information is stored at an anonymous user account 102, described in more detail below, that is created for the particular user based on the unique card hash 1103.

Pass-Through Embodiment

Figure 12:
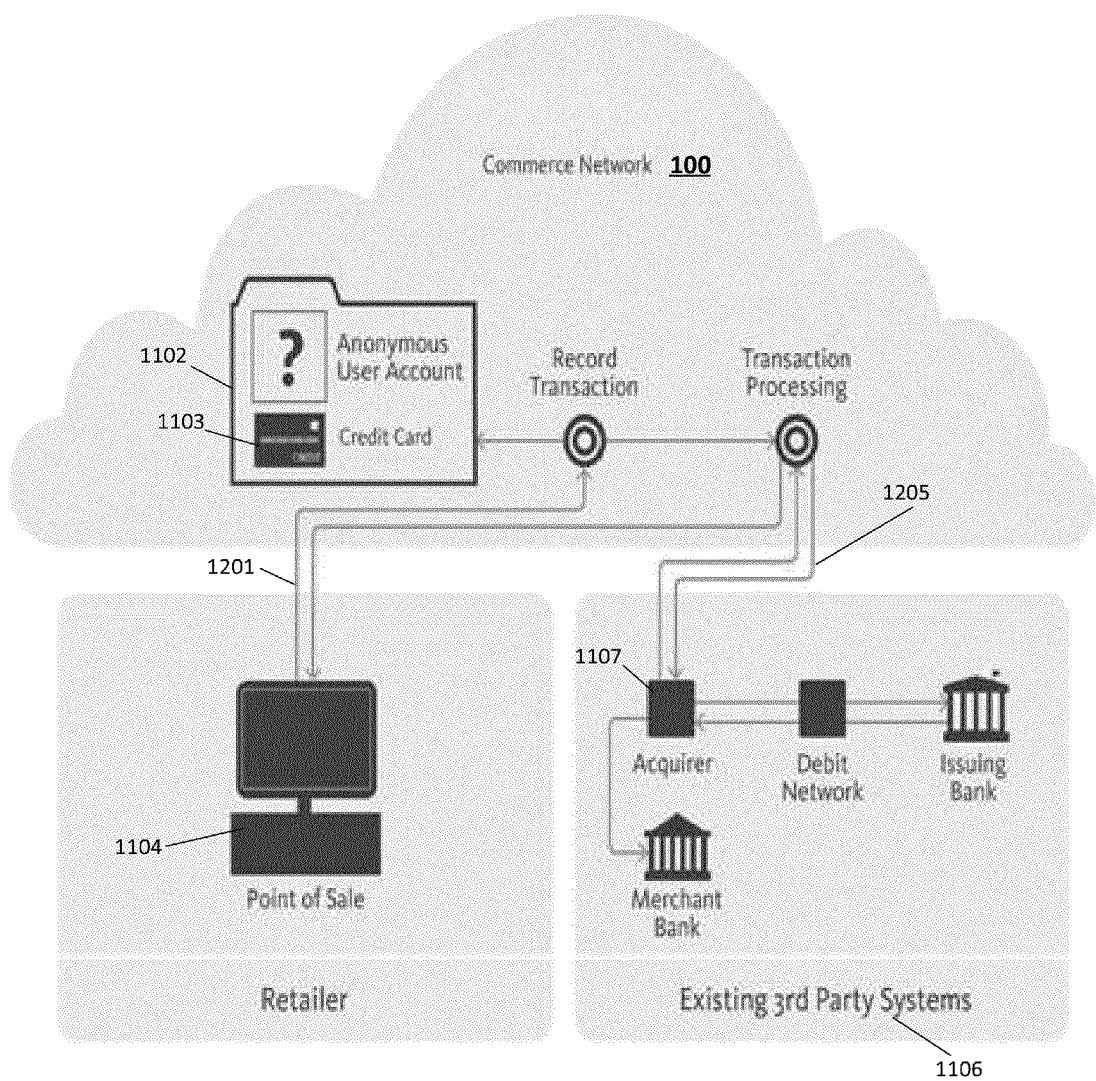
FIG. 12 illustrates a pass-through implementation to capture the user data in accordance with one embodiment.

FIG. 12 illustrates a pass-through implementation to capture the user data in accordance with one embodiment. In the embodiment of FIG. 12, commerce network 100 acts as a gateway for all payments, including traditional, non-mobile payments. As with the embodiment of FIG. 11, the basket/line level data and the card hash or cash code are sent from POS 1104 to commerce network 100 at 1201. This enables commerce network 100 to record the transaction, including line level data, in anonymous user account 1102. However, POS 1104 only sends the transaction to commerce network 100 and makes no requests of acquirer 1107. Commerce network 100 sends the transaction to acquirer 1107 at 1205, and then likewise, from acquirer 1107 back to POS 1104 when completed.

While the embodiment of FIG. 12 places a higher dependency on commerce network 100 as compared to the embodiment of FIG. 11, it also allows embodiments to provide additional functionality. Since the transaction is stored in commerce network 100, embodiments can look the transaction up after the fact and make modifications, such as returns.

As described, embodiments support accounts for users in addition to the "mobile" user account 102 described above, in order to accumulate data for "traditional" non-mobile transactions. In one embodiment, commerce network 100 implements three additional types of user accounts: "anonymous", "identified" and "verified" accounts.

Anonymous User Accounts

Credit and debit card swipe payments make up the majority of today's transactions. The ability to tie unique account identifiers to individual cards as they are swiped enables commerce network 100 to match cards with an individual consumers. This capability enables long-term insight into consumer behaviors.

In order to create a unique identifier for a card, embodiments calculate a card hash upon swipe. The card hash is generated by using the card data as input into a one way hash. The result is a stable, unique card hash that can be used as a unique identifier. In this embodiment, the card hash derived from the card is used as a proxy for the user's identity.

Every time the user swipes the same card at a merchant, the card hash will be used to lookup the user account for that card hash. If no account exists, one will be created, such as anonymous user account 1102 of FIG. 11. If an account exists, the receipt will be appended to the unique user account referenced by the card hash.

If a user uses a different card at a merchant, a different anonymous account will be used to track the transaction. Since there is no information in addition to the card hash derived from the card, these accounts cannot be shared and a unique user-card account will exist for each card used by the user at a merchant. This type of account is anonymous (i.e., users play no active role except for swiping their card) and is used to append receipts or to upgrade the account to a "identified" account, described below, by adding an email address or a phone number or other identifier.

The user specific data collection that is part of the anonymous account in accordance with some embodiments can provide valuable insight to a merchant as they can better understand an individual customer. For example, the data allows a merchant to targeted incentives to be delivered on a receipt. In the case of a user transaction, embodiments can use the customer's personal purchase history as well as the basket of good being purchased to target incentives.

For example, a merchant can issue a coupon on a receipt at the end of the transaction. Commerce network 100 could recognize that a specific customer who is currently buying something as simple as a bottle of wine had recently purchased baby formula and provide a coupon specific to the user for 10% off of diapers if the customer comes back within a week. In contrast, prior art targeted incentive systems do not have personalization or history based on a specific card, and can only target incentives using the current basket of goods being purchased.

Further, network 100 has the ability to track multiple transactions across a single retailer, or multiple retailers using the anonymous account, assuming all transactions use the same card/instrument used to create the account. Thus, when a user swipes their card to pay and that card is associated with an anonymous account on commerce network 100, commerce network 100 could issue an incentive on the printed receipt. As an example, if an anonymous account indicates a history of the anonymous user buying only sweaters, it could indicate to the POS to print an incentive giving the user 20% off of pants on the receipt.

Identified Accounts

One embodiment allows an "anonymous" account to be upgraded to an "identified" account upon the entry of some user specific data (e.g., email address, phone number, etc.) that associates a card hash with the user-provided data. The upgrade of an anonymous account to an identified account allows the user to receive digital receipts. The user can do this for each card that they use at a merchant. Over time a user may upgrade multiple accounts to the same shared identified account. An identified account may be referenced by single or multiple email addresses and/or phone numbers, and multiple card hashes.

In one embodiment, any time a user participates in a transaction, commerce network 100 provides an opportunity to link the transaction to an account. In the case of a card-based transaction, the card hash will be used to lookup the user account on commerce network 100. If the user has not provided information to identify the user account, the retailer could optionally prompt the user to link the account by asking for an email address or phone number. If the user does enter an email address the passive account for the card can be automatically upgraded to an identified account. The user could similarly link all cards to such an identified account.

One benefit to the user in providing identifying information, including an email address, is the ability to email a line-item level receipt to the customer, eliminating the need for paper receipts, if desired. The email channel also allows the user to receive email incentives to download the mobile application describe above.

Further, providing an email allows commerce network 100 to tie multiple cards to a single user account. For example, if a customer makes a purchase with their credit card and without entering their email, an anonymous user account will be created that is associated with a card hash associated with that card. If the same user later makes a purchase using their debit card, and also without entering an email address, a separate anonymous user account will be created, as there is no data yet connecting those two cards (and therefore accounts) with a single user. The introduction of an email allows for the combining of these two accounts. If the user enters their email in both scenarios, commerce network 100 recognizes these accounts as related to the same user, and consolidates them both under the same user email.

Further, the ability to create a user account using a card hash and then (optionally) linking the account with an email address provides marketing opportunities to the merchants. Having a user's email enables the merchant to use email marketing tailored at the user level, as the merchant is able to match all data, purchasing history, line level data, and location information with a specific customer, and then send custom targeted incentives via email. As with the receipts discussed above for the anonymous accounts, these receipts can be emailed to the user.

Verified Accounts

Once a user has upgraded to an identified account they will start to receive digital receipts and an invitation to further upgrade their account to a verified account in one embodiment. To upgrade to a verified account, the user can create an account online using commerce network 100 and "claim" their linked accounts usually by clicking on their invite (found within email or text). When a user creates a verified account online, the user can link existing anonymous or identified accounts that they can provide authentication for. For example, assume a user has used one card in the past as shown in FIG. 11. An anonymous account would be associated with this card. If the same user has also used a different card, and provided an email in the past when swiping that card, an identified account would be associated with the second card. However, because the user not has entered an email with the first card, the anonymous account associated with the first card would not be associated with the identified account associated with the second card and the email. However, through the online sign up for a verified account, these card accounts would be linked as long as the user authenticates both cards while creating their account.

An identified account can be upgraded to a "verified" account by having the user verify that an email address or other contact information has been verified to be accurate and in use. The identified account allows for direct communication with individual users, and this outlet can be used to incent customers to upgrade their accounts to a verified active accounts. For example, a link to account creation or a link to download a mobile application can be embedded within emails or text messages to users with identified accounts.

The verified account allows users to collect offers and coupons for in-store redemption online and associate them with the cards they use to make purchases in-store, and allows them to view receipts and configure their account from a browser. Further, verified accounts allow for users to clip offers on the web and have them associated with their accounts. Then, when the user makes an in-store purchase, these offers can be redeemed when the user uses a payment instrument associated with their account.

The identified account allows for offers to be redeemed because they are associated with a specific card. In contrast, the verified account allows for those offers to be associated with an account. Thus, a user with a full account can redeem an offer without the restriction of using a particular card. Verified accounts allow for users to view past receipts and configure their accounts online. Therefore, they can reference stored receipts, add or remove payment instruments and choose preferences such as default payment instrument and adjust communication settings.

Mobile Accounts

As describe above, a "mobile account" or user account 102 is created when a user downloads an application on a mobile device. Users can link accounts by inputting and authenticating multiple cards and contact information within the application. If a user has not created a verified account, none of the existing accounts, such as anonymous accounts or identified accounts that may be associated with their cards or contact information have been associated with the application. As such, when the user inputs this information into the mobile application, these existing accounts can be associated. If there are no existing accounts associated with a new mobile user's payment or contact information, there is no need to associate accounts, as there are no existing accounts for that user.

A mobile account in one embodiment offers more user features than the other types of accounts. It enables users to collect offers and coupons for in-store redemption entirely via their mobile device, it lets them use a mobile application to make in-store purchases, and it lets users clip and organize offers from multiple channels and store them in their mobile account and redeem offers directly from their phone.

As with the transition from identified to verified accounts, embodiments can provide users with incentives to move from a verified account to a mobile account. A link to download a mobile application can be embedded in the online account, or within emails or text messages to users with a verified account.

Further, a user's purchase history across online and in-store can be linked to their mobile account in commerce network 100. As the user enters the store, a sales associate can see information according to the retailer's preferences (i.e., a department store may want to see information such as size, annual spend, loyalty program enrollment, previous purchases, frequency, etc.). The sales associate can then personalize the user's in-store experience. For example, that sales associate might say to a user named "Jane", "Jane, we have a new collection just out from one of your favorite designers" or "Jane, it has been a few months since you bought your foundation. Do you need any more today?"

Figure 13:
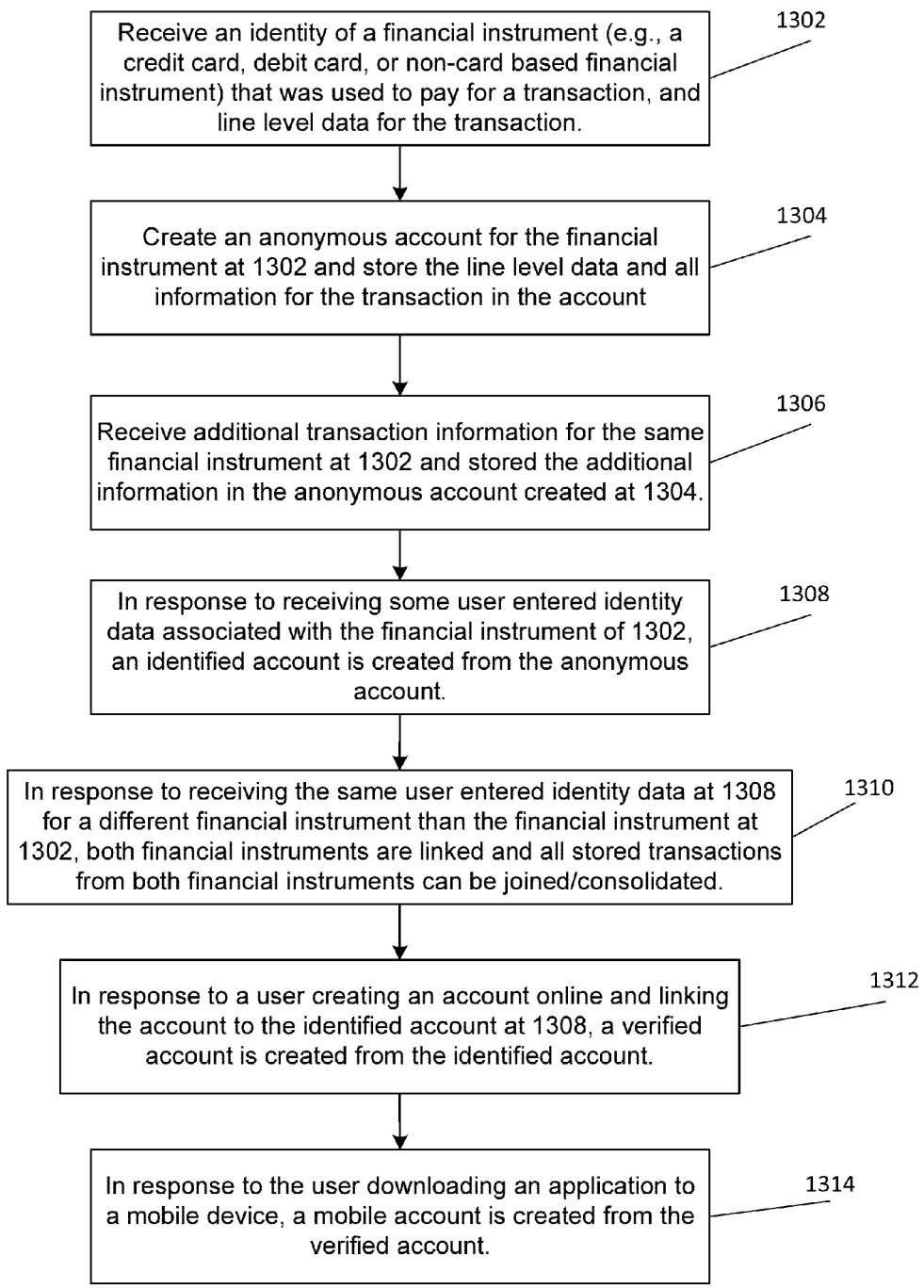
FIG. 13 is a flow diagram of the functionality of the commerce network module of FIG. 1 when conducting transactions in accordance with one embodiment.

FIG. 13 is a flow diagram of the functionality of commerce network module 16 of FIG. 1 when conducting transactions in accordance with one embodiment.

At 1302, in response to a transaction, module 16 receives an identity of a financial instrument (e.g., a credit card, debit card, or non-card based financial instrument) that was used to pay for the transaction, and line level data for the transaction. The identity may be based on a number of the instrument. In one embodiment, the identity is a hash of the instrument number, such as a credit or debit card number hash. In one embodiment, the hash is an encrypted reference to the instrument number, rather than the number itself, or the hash can be an encrypted token that is associated with a card number and/or card holder data At 1304, module 16 creates an anonymous account for the financial instrument at 1302 and stores the line level data and all information for the transaction in the account.

At 1306, additional transaction information, including line level data, for the same financial instrument at 1302 is received and stored in the anonymous account created at 1304. Therefore, for example, data for all future transactions that use the same credit card or debit card at 1302 are associated with a single anonymous account.

At 1308, in response to receiving some user entered identity data associated with the financial instrument, an identified account is created from the anonymous account. The user entered data can include an email address or telephone number.

At 1310, the same user entered identity data at 1308 is also received for a different financial instrument than the financial instrument at 1302. As a result, both financial instruments are linked and all stored transactions from both financial instruments can be joined/consolidated. Additional financial instruments, and all underlying stored transaction data, can also be linked together.

At 1312, in response to a user creating an account online and linking the account to the identified account at 1308, a verified account is created from the identified account.

At 1314, in response to the user downloading an application to a mobile device, a mobile account is created from the verified account.

As disclosed, accounts are established through a network so that transactions across the network may be tracked and associated with a user. The data stored in association with the transactions, such a line level data of all purchases, can be used to perform analytics and to provide targeted communications and promotions to the user.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer readable medium having instructions stored thereon that, when executed by a processor, cause the processor to process transactions, the processing comprising:
   in response to a first transaction using a first financial instrument, receiving an identity of the first financial instrument, wherein the first transaction comprises a purchase of one or more first items from a first retailer;
   creating a first anonymous account that corresponds to the first financial instrument;
   storing first line level data associated with the first transaction in the first anonymous account, wherein the first line level data comprises a description of the one or more first items; and
   in response to a second transaction using the first financial instrument, storing second line level data associated with the second transaction in the first anonymous account;
   wherein the second transaction comprises a purchase of one or more second items, and the second line level data comprises a description of the one or more second items.

2. The computer readable medium of claim 1, wherein the first financial instrument comprises an identifying number, and the identity is a hash of the identifying number.

3. The computer readable medium of claim 2, wherein the first financial instrument comprises a credit card, and the identifying number is an associated credit card number.

4. The computer readable medium of claim 2, wherein the first financial instrument comprises a debit card, and the identifying number is an associated debit card number.

5. The computer readable medium of claim 1, the processing further comprising:

receiving an identity of a user of the first financial instrument;

receiving the identity of the user of a second financial instrument that corresponds to a second anonymous account, wherein the user of the second financial instrument is the same user as the user of the first financial instrument; and consolidating the first anonymous account with the second anonymous account.

6. The computer readable medium of claim 5, wherein the identity of the user comprises at least one of an electronic mail account, a name, or a telephone number.

7. The computer readable medium of claim 1, the processing further comprising:

in response to the second transaction, providing a receipt that comprises future purchase incentives based at least on the first line level data associated with the first transaction and the second line level data associated with the second transaction.

8. The computer readable medium of claim 1, further comprising:

linking the first anonymous account with a mobile account that comprises a mobile application running on a mobile device; and providing future purchase incentives based at least on the first line level data associated with the first transaction and the second line level data associated with the second transaction to a device linked to the mobile application.

9. The computer readable medium of claim 1, wherein the second transaction comprises the purchase of the one or more second items from a second retailer that is different from the first retailer.

10. A computer implemented method for processing transactions, the method comprising:

in response to a first transaction using a first financial instrument, receiving an identity of the first financial instrument, wherein the first transaction comprises a purchase of one or more first items from a first retailer;

creating a first anonymous account that corresponds to the first financial instrument;

storing first line level data associated with the first transaction in the first anonymous account, wherein the first line level data comprises a description of the one or more first items; and in response to a second transaction using the first financial instrument, storing second line level data associated with the second transaction in the first anonymous account;

wherein the second transaction comprises a purchase of one or more second items, and the second line level data comprises a description of the one or more second items.

11. The computer implemented method of claim 10, wherein the first financial instrument comprises an identifying number, and the identity is a hash of the identifying number.

12. The computer implemented method of claim 11, wherein the first financial instrument comprises a credit card, and the identifying number is an associated credit card number.

13. The computer implemented method of claim 11, wherein the first financial instrument comprises a debit card, and the identifying number is an associated debit card number.

14. The computer implemented method of claim 10, the method further comprising:

receiving an identity of a user of the first financial instrument;

receiving the identity of the user of a second financial instrument that corresponds to a second anonymous account, wherein the user of the second financial instrument is the same user as the user of the first financial instrument; and consolidating the first anonymous account with the second anonymous account.

15. The computer implemented method of claim 14, wherein the identity of the user comprises at least one of an electronic mail account, a name, or a telephone number.

16. The computer implemented method of claim 10, the method further comprising:

in response to a second transaction, providing a receipt that comprises future purchase incentives based at least on the first line level data associated with the first transaction and the second line level data associated with the second transaction.

17. The computer implemented method of claim 10, further comprising:

linking the first anonymous account with a mobile account that comprises a mobile application running on a mobile device; and providing future purchase incentives based at least on the first line level data associated with the first transaction and the second line level data associated with the second transaction to a device linked to the mobile application.

18. The computer implemented method of claim 10, wherein the second transaction comprises the purchase of the one or more second items from a second retailer that is different from the first retailer.

19. A commerce network comprising:

a processor:

a memory coupled to a process and storing a module that, when executed by the processor, causes the processor to:

in response to a first transaction using a first financial instrument, receiving an identity of the first financial instrument, wherein the first transaction comprises a purchase of one or more first items from a first retailer;

creating a first anonymous account that corresponds to the first financial instrument;

storing first line level data associated with the first transaction in the first anonymous account, wherein the first line level data comprises a description of the one or more first items; and in response to a second transaction using the first financial instrument, storing second line level data associated with the second transaction in the first anonymous account;

wherein the second transaction comprises a purchase of one or more second items, and the second line level data comprises a description of the one or more second items.

20. The network of claim 19, wherein the first financial instrument comprises an identifying number, and the identity is a hash of the identifying number.

21. The network of claim 20, wherein the first financial instrument comprises a credit card, and the identifying number is an associated credit card number.

22. The network of claim 20, wherein the first financial instrument comprises a debit card, and the identifying number is an associated debit card number.

23. The network of claim 19, further comprising:

receiving an identity of a user of the first financial instrument;

receiving the identity of the user of a second financial instrument that corresponds to a second anonymous account, wherein the user of the second financial instrument is the same user as the user of the first financial instrument; and consolidating the first anonymous account with the second anonymous account.

24. The network of claim 23, wherein the identity of the user comprises at least one of an electronic mail account, a name, or a telephone number.

25. The network of claim 19, the processing further comprising:

in response to a second transaction, providing a receipt that comprises future purchase incentives based at least on the first line level data associated with the first transaction and the second line level data associated with the second transaction.

26. The network of claim 19, further comprising:

linking the first anonymous account with a mobile account that comprises a mobile application running on a mobile device; and providing future purchase incentives based at least on the first line level data associated with the first transaction and the second line level data associated with the second transaction to a device linked to the mobile application.

27. The network of claim 19, wherein the second transaction comprises the purchase of the one or more second items from a second retailer that is different from the first retailer.

* * * * *